United States Patent [19]
Terashita

[11] Patent Number: 6,160,634
[45] Date of Patent: *Dec. 12, 2000

[54] DIGITAL PRINTER AND IMAGE DATA CONVERSION METHOD

[75] Inventor: Takaaki Terashita, Kanagawa, Japan

[73] Assignee: Fuji Photo Film Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/767,309

[22] Filed: Dec. 16, 1996

[30] Foreign Application Priority Data

Dec. 25, 1995 [JP] Japan .................................. 7-337414
Dec. 25, 1995 [JP] Japan .................................. 7-337415

[51] Int. Cl.[7] .............................. G06F 15/00; G03F 3/08
[52] U.S. Cl. ............................................ 358/1.9; 358/520
[58] Field of Search ..................................... 358/296, 302, 358/448, 401, 521, 522, 523, 501, 1.9, 1.2, 1.13, 1.17; 382/169, 232, 305

[56] References Cited

U.S. PATENT DOCUMENTS

| | | | |
|---|---|---|---|
| 4,591,904 | 5/1986 | Urabe et al. .............................. | 358/500 |
| 4,679,095 | 7/1987 | Kitamura et al. ........................ | 358/280 |
| 4,792,979 | 12/1988 | Nomura et al. ........................... | 382/54 |
| 4,819,193 | 4/1989 | Imao ........................................ | 364/526 |
| 4,893,180 | 1/1990 | Shigaki et al. ............................ | 358/80 |
| 5,353,095 | 10/1994 | Terashita .................................. | 355/38 |
| 5,410,418 | 4/1995 | Yonezawa ................................ | 358/456 |
| 6,018,589 | 1/2000 | Hyodo ..................................... | 382/168 |

*Primary Examiner*—Madeleine Nguyen
*Attorney, Agent, or Firm*—Sughrue, Mion, Zinn Macpeak & Seas, PLLC

[57] ABSTRACT

In a digital printer, a great number of images recorded on the same type recording medium as an original to be reproduced are roughly pre-scanned prior to main scanning of the original. The pre-scanning image data is sorted according to green density levels, and red and blue densities of those pixels which are selected according to a standard are respectively accumulated for each green density level. Mean values of the red and blue densities accumulated in the respective green density levels are used as the pixel selection standard. Different kinds of gradation balance data are obtained by use of different methods from the mean values of the accumulated image data and/or image data of the original, to derive optimum gradation balance data from these different kinds of gradation balance data by selecting and combining the data. A gradation conversion table is produced from the optimum gradation balance data and previously stored gradation curve data. Main scanning image data of the original is converted through the gradation conversion table.

35 Claims, 13 Drawing Sheets

| FILM TYPE | G-DENSITY | PIXEL NUMBER | ACCUMULATED R-DENSITY | ACCUMULATED B-DENSITY | |
|---|---|---|---|---|---|
| A | 0.0 | 173 | 1.65 | 1.87 | |
| | 0.05 | 185 | 9.37 | 9.68 | |
| | 0.10 | 190 | 19.4 | 20.2 | MA1 |
| | ⋮ | ⋮ | ⋮ | ⋮ | |
| B | 0.0 | 112 | 0.47 | 0.58 | |
| | 0.05 | 384 | 16.9 | 18.2 | |
| | 0.10 | 460 | 40.8 | 48.8 | MA2 |
| | ⋮ | ⋮ | ⋮ | ⋮ | |
| | | | | | |

DIGITAL PRINTER AND IMAGE DATA CONVERSION METHOD

BACKGROUND OF THE INVENTION

1. Field of the Invention

The present invention relates to a digital printer and an image data conversion method for the digital printer wherein image data obtained from a photographic image or the like is processed to be digital image data for reproducing the image as a hard copy.

2. Background Arts

In a conventional digital printer, an image signal is obtained through a photo-electric imaging device directly from a subject, or from a reflective original such as a photo-print or a transparent original such as a frame on a photographic film. The image signal is processed to obtain image control values. Based on the image control values, an image is reproduced and recorded on a photographic paper or another recording material. For example, JPA 2-157758 discloses determining a reference density point for each color component based on a highlight density and a shadow density in the original, and setting up a gradation conversion curve to assign these reference density values to given signal levels.

JPA 6-242521 discloses dividing a scene into several areas to detect a maximum value and a minimum value of each color from each area, determining a maximum reference value and a minimum reference value of each color from these maximum and minimum values of the divided areas. The maximum reference values of three colors, i.e. red (R), green (G) and blue (B), are reproduced as white, whereas the minimum reference values of three colors as black.

JPA 6-178113 discloses producing a histogram from image data, accumulating histograms of a plurality of images according to the type of recording media, and deriving gradation characteristics based on the image data of an original and the accumulated histogram data, to produce a conversion table for the image reproduction. This publication also discloses modifying the histogram to eliminate lopsided frequencies in some density levels, and selecting those images relating to one another among from a series of images, to utilize their data as image representative values for reproduction conversion curves. Specifically, JPA 6-178113 discloses to obtain weighted mean values of those three color density values which belong to a given accumulation degree, e.g. 50%, of a histogram made by accumulating data for each type of photographic films, and those three color density values which belong to a given accumulation degree, e.g. 50%, of a histogram made by accumulating data for each image, and produce such a conversion table that is adapted to make the weighted mean values equal to the former three color density values. Also, JPA 4-260274 and JPA6-253149 disclose pre-setting conversion tables for respective film types, and selecting one of those tables.

In almost all conventional digital image recording methods, highlight and shadow of the original are controlled to be reproduced as highlight and shadow in the reproduced image, as above described JPA 2-157758. This method is disadvantageous when the highlight and shadow of the original are not white and black. In a case where a scene is divided into a plurality of areas to determine maximum and minimum reference values of the three colors from maximum values and minimum values of the respective colors of the respective areas, like JPA 6-242521, dividing the scene can result in wrong reference values. If the maximum values and the minimum values of any area do not represent neutral gray, reproducing the maximum and minimum reference values as white and black would lower the quality or color balance of the reproduced image. To solve this problem, various methods for detecting gray points or neutral three color densities in a maximum density range have been suggested: manual designation of a gray point, reading image data from a color patch of the same type photographic film as the original, and so forth.

The method as disclosed in JPA 6-178113, wherein a histogram is made from image data and the histogram is accumulated in a memory provided for each type of recording media, is useful for those recording media like reversal films where exposure amounts on photography are substantially uniform and most images are properly exposed. However, for those recording media like negative films where color balance, gradation and other characteristic values vary depending upon exposure amounts on photography, the histogram varies according to the exposure amount even for the same photographic subject, so that it is difficult to exactly obtain a requisite film characteristic curve from simple accumulation of the histograms. Moreover, obtaining a weighted mean value is meaningless, because the three color density values obtained from the histogram of each image are required to be coincide with those obtained from the histogram of the corresponding film type, rather than their weighted mean values.

FIGS. 18A to 18C are density histograms for red (R-density) of images of the same subject recorded on a negative film, but respectively under-exposed, properly exposed and over-exposed ones. As seen from these diagrams, even if the images are photographed from the same subject on the same negative film, their histograms vary depending upon exposure conditions. Concerning originals on negative film, accumulation of their histograms does not result in a histogram for an average subject, but vainly equalizes and flattens the histograms.

The method of pre-setting conversion tables for respective film types and selecting one of those tables, such as disclosed in JPA 4-260274, is insufficient because the preset data is not optimized for each imaging device, and is not able to adapt to the variation in film characteristic curve.

Color balance of the negative film varies according to photographic exposure amount, film type, the light source used for photography, color fading of the photographic image. Moreover, according to the conventional color balance setting up method, reproduction conditions are determined for each image based on image data of each image, there can be color variance between the reproduced images.

SUMMARY OF THE INVENTION

In view of the foregoing, a prime object of the present invention is to provide a digital printer and a method of converting image data therefor, by which a high quality image can be reproduced with proper color balance in all density ranges from highlight through shadow levels, even if the original is under-exposed or over-exposed, and whatever type recording medium the original is recorded on. Reproducing images with proper color balance means that gray balance of the reproduced image is adequate. That is, neutral gray is reproduced as neutral gray in all density ranges, so that unmixed and clear color reproduction is achieved.

Another object of the present invention is to minimize color variance between the reproduced images, while taking gradation of the originals into consideration. A further object of the present invention is to provide a method of automatically finding a gray point with reliability.

To achieve the above object, the present invention is comprised of steps of accumulating image data of a plurality of images recorded on a particular type recording medium that is used for recording an original to be reproduced, deriving those values representative of characteristics of the particular type recording medium from the accumulated image data, and determining based on the representative values image data conversion conditions for converting image data of the original. The number of images whose data is to accumulate may be a half dozen, several hundreds, several thousands, or more. It is preferable to obtain at least high-density and low-density reference representative values from the representative values in correspondence with high-density and low-density reference values of the original, and determine the image data conversion conditions based on these reference representative values and recording densities to which the reference representative values are to correspond. It is preferable to accumulate image data of those pixels which are selected according to a predetermined standard. The pixel selection standard is preferably determined based on image data of a great number of images having been accumulated for each type of recording media. It is possible to accumulate image characteristic values or conversion curves for each type of recording media, instead of accumulating image data.

Since image data of all image density ranges of a great number of images is accumulated for each type of recording media, and gradation balance data is statistically obtained from the accumulated image data, the data represents gradation balance characteristics of a particular recording media type with high accuracy, compared with the conventional methods where gradation balance data is obtained from a limited density range or level of a single image. Therefore, it becomes possible to reproduce an image with proper color balance in all density ranges from the highlight through shadow, even if the original is under-exposed or over-exposed.

Accumulating only those pixels which meet the predetermined standard permits obtaining accurate gradation balance data even with a relatively small number of images whose image data has been accumulated.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
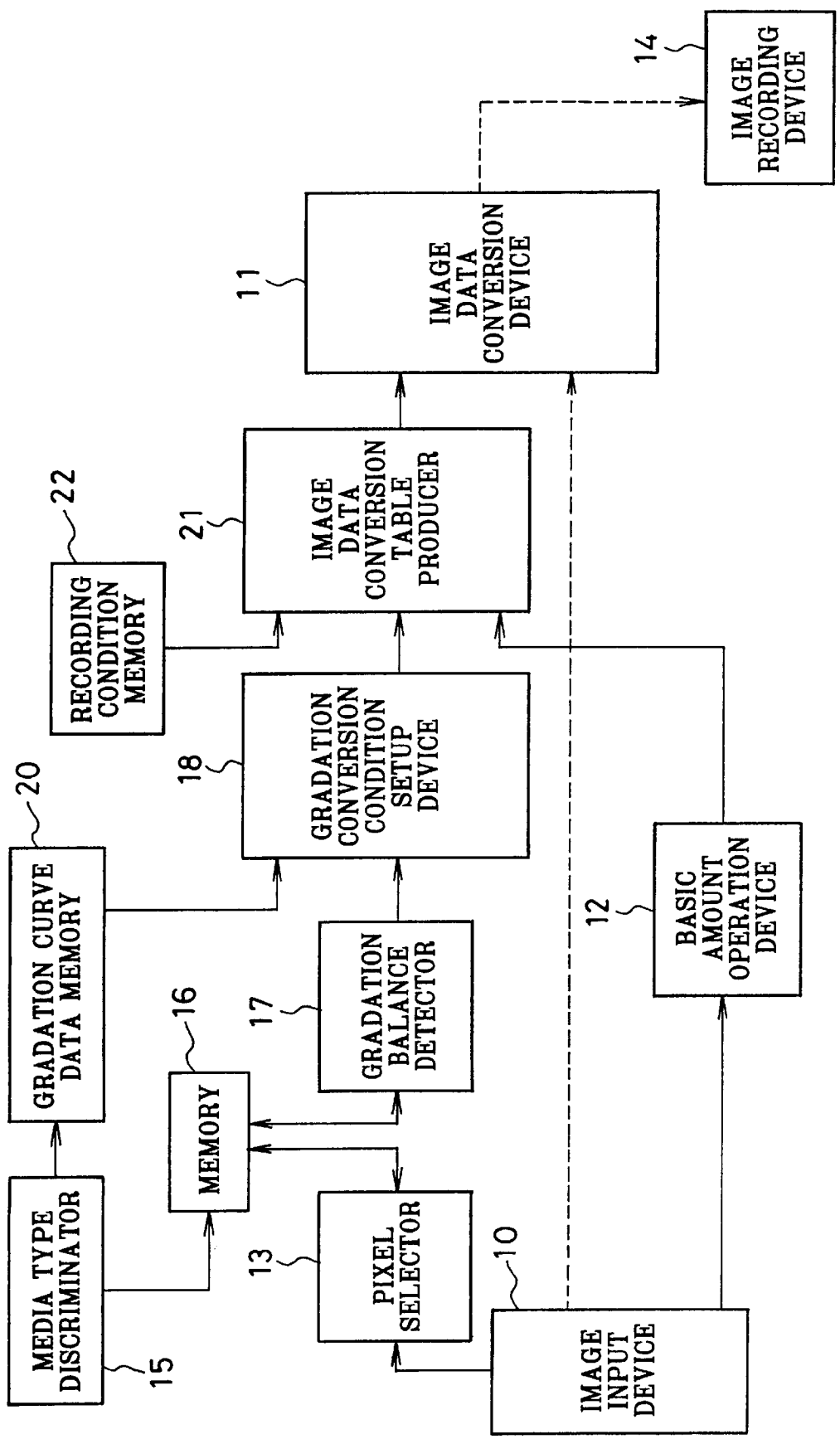
FIG. 1 is a functional block diagram of a digital printer according to an embodiment of the invention.

In FIG. 1, an image input device 10 may be a well-known diginal imaging device or an image scanner which picks up each original image on a recording medium. The following embodiments relate to those cases where the image input device 10 is a film scanner which picks up developed images on negative films, and converts it to image data. The image input device 10 can be switched over between a main scanning mode and a pre-scanning mode. In the pre-scanning mode, the original image is picked up as thousands of pixels. The number of pixels for pre-scanning may vary from hundreds to tens of thousand depending upon requisite quality of print and processing speed. In the main scanning mode, the original image is picked up as hundreds thousand to millions of pixels.

In FIG. 1, the flow of main scanning image data detected by main scanning is shown by dashed lines, while the flow of other data including pre-scanning image data detected by pre-scanning is shown by solid lines. The main scanning image data is sent from the image input device 10 to an image data conversion device 11, to be converted into recording data. The pre-scanning image data is sent to a basic amount operation device 12 and a pixel selector 13. The recording data is sent to an image recording device 14 for recording an reproduced image on a recording material such as photographic paper.

A film type discriminator 15 is to output a film type signal representative of the type of medium of the original, in this instance, the type of negative film on which the original image is recorded. The film type discriminator 21 may be a bar code reader, a magnetic head or another kind of data reading device for reading bar code, magnetic data or the like from the negative film. The film type discriminator 15 may include those devices which discriminate between a photographic film and another medium, between a negative film and a reversal film. Needless to say, those original images recorded in series on the same photographic filmstrip, are considered to belong to the same film type.

The pre-scanning image data is accumulated for each film type in a memory 16. Specifically, the memory 16 accumulates red density values and blue density values with reference to green density values of the original in individual memory areas MA1, MA2 . . . , which are addressed according to the film type, as shown for example in FIG. 2. Namely, according to the present embodiment, the green density is used as the standard for classifying the image data. Specifically, the level of the green density of each pixel of the image data is determined, and the red density and the blue density are accumulated according to the density level of the green density, wherein the density levels are scaled by 0.05 in the embodiment shown in FIG. 2. However, the density level scale is not limited to 0.05. For example, if more accurate data conversion is necessary, the scale may be 0.01 or less. If the accuracy of data conversion need not be so high, the scale may be about 0.1 to 0.5. The memory 16 also counts and stores the number of pixels whose density values are accumulated in each reference density level, i.e. green density level, of each film type, so as to permit averaging the accumulated image data with the number of pixels. Thus, a mean density value of red or blue can be obtained in relation to each green density level.

The image data accumulation is described in more detail, for example, in JPA 3-53235. Averaging data of a great number of images will lead to a constant result that corresponds to or approximates to neutral gray. It is possible to convert the approximately neutral gray to neutral gray by adding appropriate correction values.

Figures 2, 3:
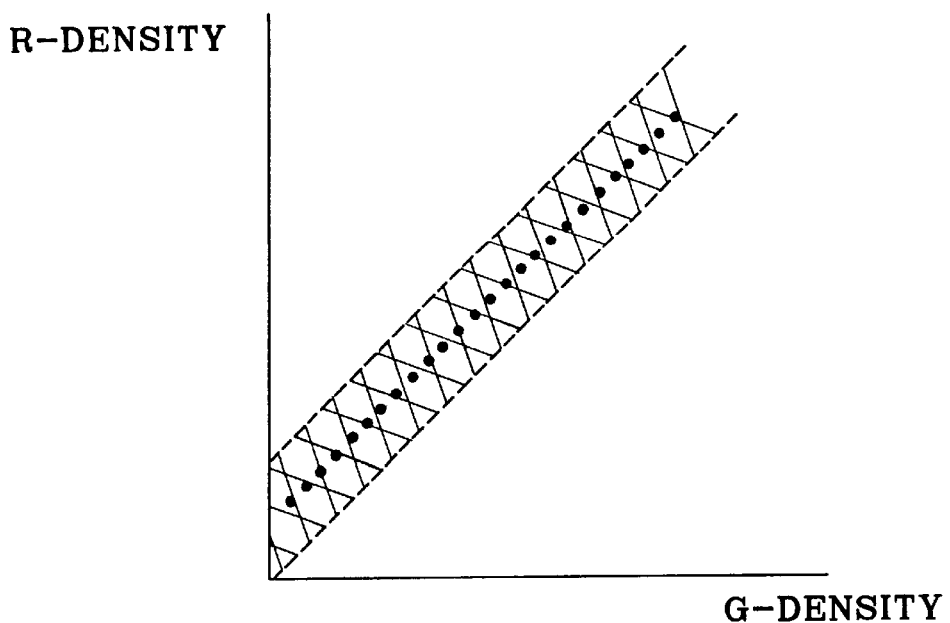
FIG. 2 is an explanatory view illustrating an example of data accumulated in a memory of FIG. 1.
FIG. 3 is a graph illustrating an example of gradation balance data obtained from image data accumulated in the memory, and a pixel selection range determined based on the gradation balance data.

The pixel selector 13 selects those pixels whose densities are in a range around the mean density values of the image data accumulated for the film type of the original in the memory 16. FIG. 3 shows an example of red density mean values of the accumulated image data in relation to green density levels, and the range around the means density values by hatched area. The image data of the selected pixels is stored in the memory 16. Because the three color mean values of the accumulated image data correspond or approximate to three color densities of an image of a gray subject, the selected pixels also belong to a subject color range around neutral gray. Accordingly, as the accumulated number of pixels increases, more accurate three color densities of the negative film for a neutral gray subject can be detected throughout the entire density range. Image data accumulation for each film type permits obtaining reliable image data specific to each individual film type, and the reliability increases with the number of images of the accumulated image data. It is preferable to pre-scan a great number of images to accumulate image data for predetermining a pixel selection range for each film type prior to scanning an original to be actually reproduced.

Figure 18A:
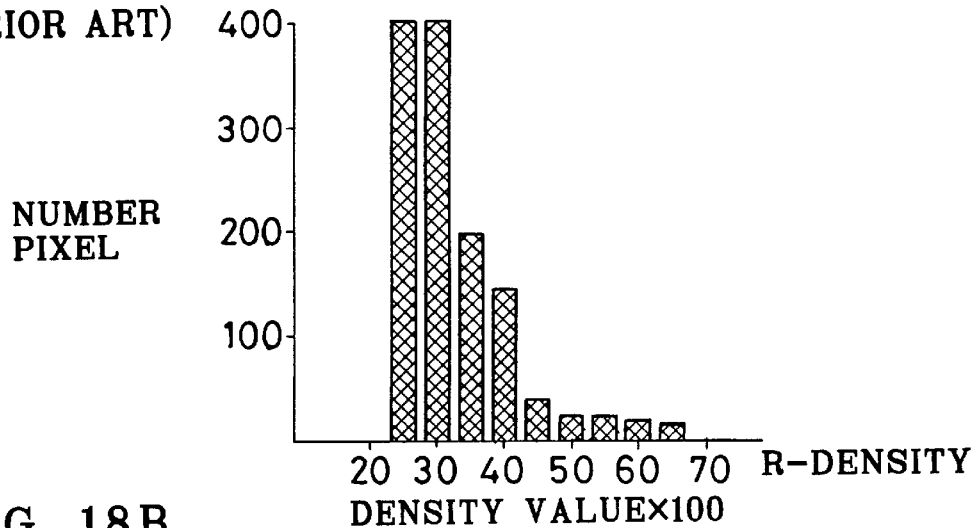
FIGS. 18A, 18B and 18C are density histograms for red relating respectively to under-exposed, properly exposed and over-exposed images of the same subject photographed on the same negative film.
Figure 18B:
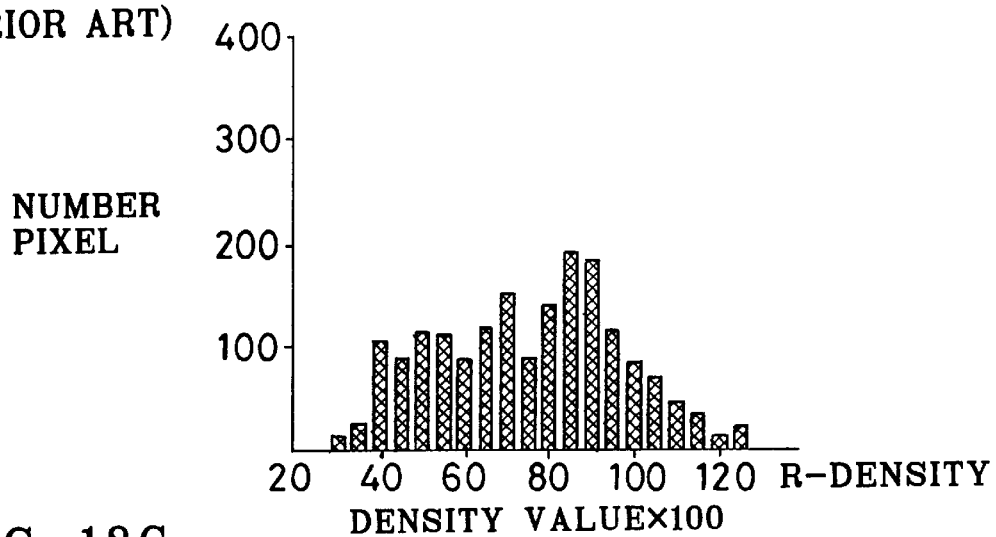
Figure 18C:
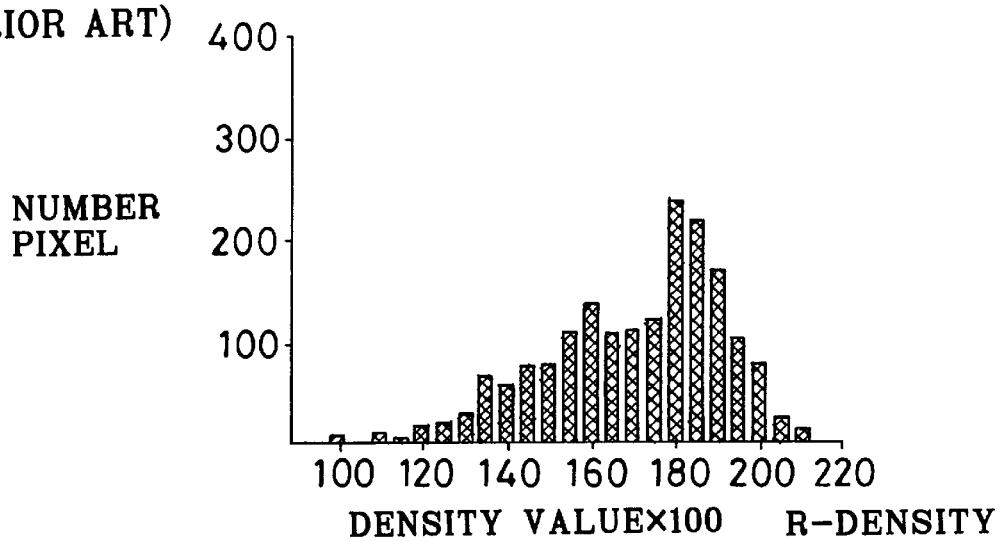

The reason why the pixel selector 13 selects those pixels which represent neutral gray or approximately neutral gray subject, to accumulate the image data of those pixels in the memory 16 is as follows. As described above, the balance of three color densities of a color negative photographic film vary depending upon film density, and the gradation balance varies depending upon the type of recording media and the film type. It is known in the art to previously store color balance data of various film types, or to derive color balance from a single image. However, there is a limit in accuracy of these methods, because color balance derived from maximum three color densities or high-density reference values according to the maximum densities of a single image can differ from those of another image even if the two images are recorded on the same type medium, as shown for example in FIGS. 18A to 18C.

Figure 4:
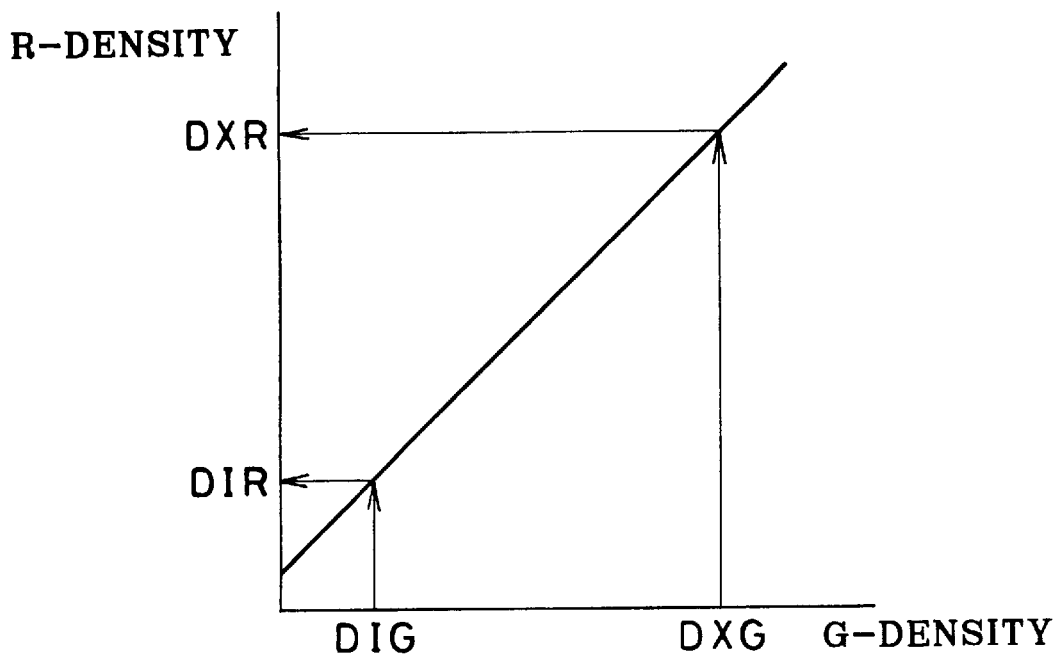
FIG. 4 is a graph illustrating a process of obtaining high-density and low-density reference balance values by use of a gradation balance curve produced from the gradation balance data.

A gradation balance detector 17 detects gradation balance data of the film type of the original on the basis of accumulated values from the memory 16. The gradation balance data, which consists of a plurality of points as shown in FIG. 3, is subjected to a well-known smoothing process, to be modified as a continuous straight line or smooth curve as shown in FIG. 4. In the same way, a gradation balance curve representative of a relationship between blue density and green density of the accumulated image data is produced.

Then, a mean value of maximum densities of three colors of the original image is determined as a high-density reference value "DXG" for green, and a red density "DXR" is determined in association with the reference value DXG according to the gradation balance curve of red relating to green, as is shown in FIG. 4. Also, a blue density "DXB" is determined in association with the reference value DXG according to the gradation balance curve of blue relating to green. These values DXR and DXB are red and blue densities for obtaining neutral gray in combination with the green density DXG as the high-density reference value. Therefore, these three values DXG, DXR and DXB will be referred to as high-density reference balance values "DXi", wherein i=R, G or B. In the same way, a mean value of minimum densities of three colors of the original image is determined as a low-density reference value "DIG" for green, to determine red and blue densities "DIR" and "DIB" for obtaining neutral gray in combination with the green density DIG. These three values DIG, DIR and DIB will be referred to as low-density reference balance values "DIi". Although three color mean values are used as the high-density reference value and the low-density reference value in the present embodiment, it is possible to use respective color densities corresponding to a maximum density and a minimum density, as the high-density reference value and the low-density reference value.

Figure 5:
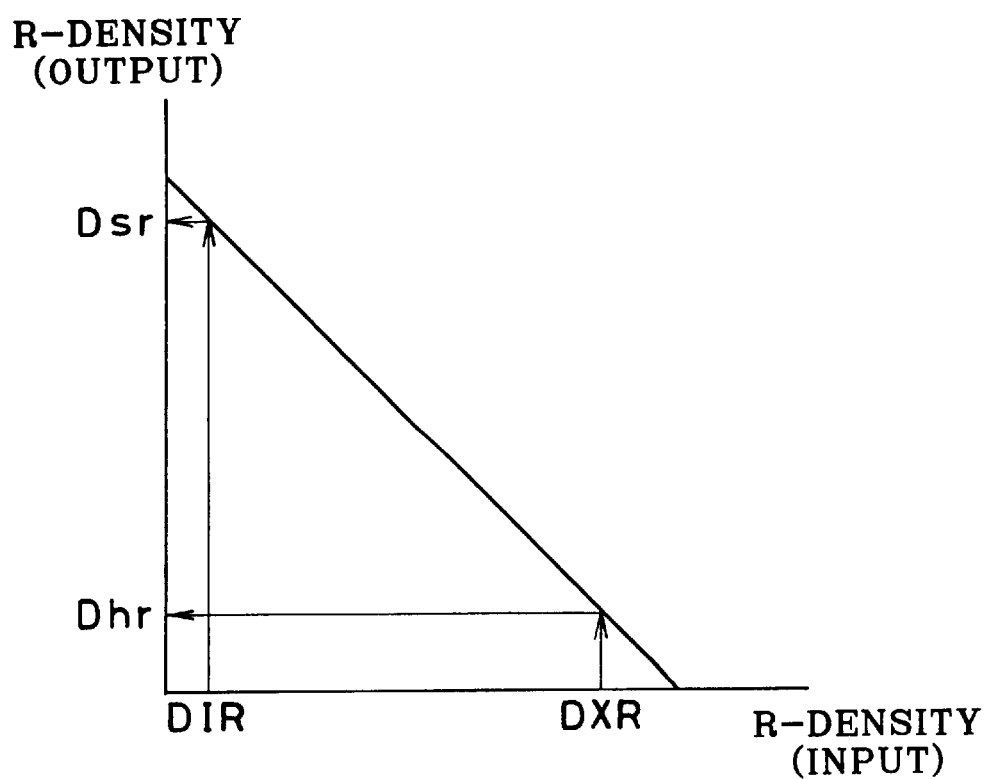
FIG. 5 is a graph illustrating an example of gradation balance conversion table.

A gradation conversion condition setup device 18 first produces a gradation balance conversion table for each color by connecting two coordinate points (DXi, Dhi) and (DIi, Dsi) which are defined by the high-density reference balance value DXi and a highlight recording density "Dhi" predetermined for each color, and the low-density reference balance value DIi and a shadow recording densities "Dsi" predetermined for each color, respectively. FIG. 5 shows an example of the gradation balance conversion table for red. In FIG. 5, Dhr and Dsr represent a highlight level and a shadow level of the recording data for red corresponding to the high-density and low-density reference values DXR and DIR of the image data for red. Since the gradation balance conversion table as shown in FIG. 5 equally converts half-tone image densities into recording densities between the predetermined highlight and shadow densities, under-exposed negative images or the like would not always be reproduced with a natural tone reproduction. For this reason, the gradation balance conversion table is modified with gradation curve data.

Figure 6:
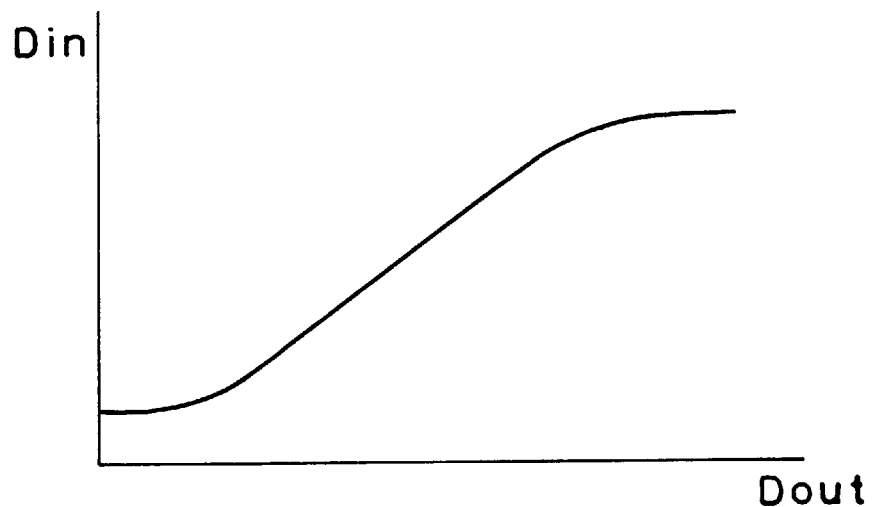
FIG. 6 is a graph illustrating an example of gradation curve data.

FIG. 6 shows an example of gradation curve data. The gradation curve data is a conversion table that corresponds to the characteristic curve of a photographic recording medium, and converts input data "Din" into output data "Dout". The gradation curve data represents the gradient that corresponds to the inclination of the characteristic curve of a photosensitive material. Separating the gradation curve or gradient from the gradation balance makes it possible to utilize a gradation balance mean value of a great number of images. The gradation curve need not be so precise as the gradation balance data, so that it is possible to use predetermined data as the gradation curve data. The gradation curve data is written for each type of recording media in the gradation curve data memory 20, and is selected in response to the film type signal from the film type discriminator 15. The selected gradation curve data is sent to the gradation conversion condition setup device 18.

Figure 7:
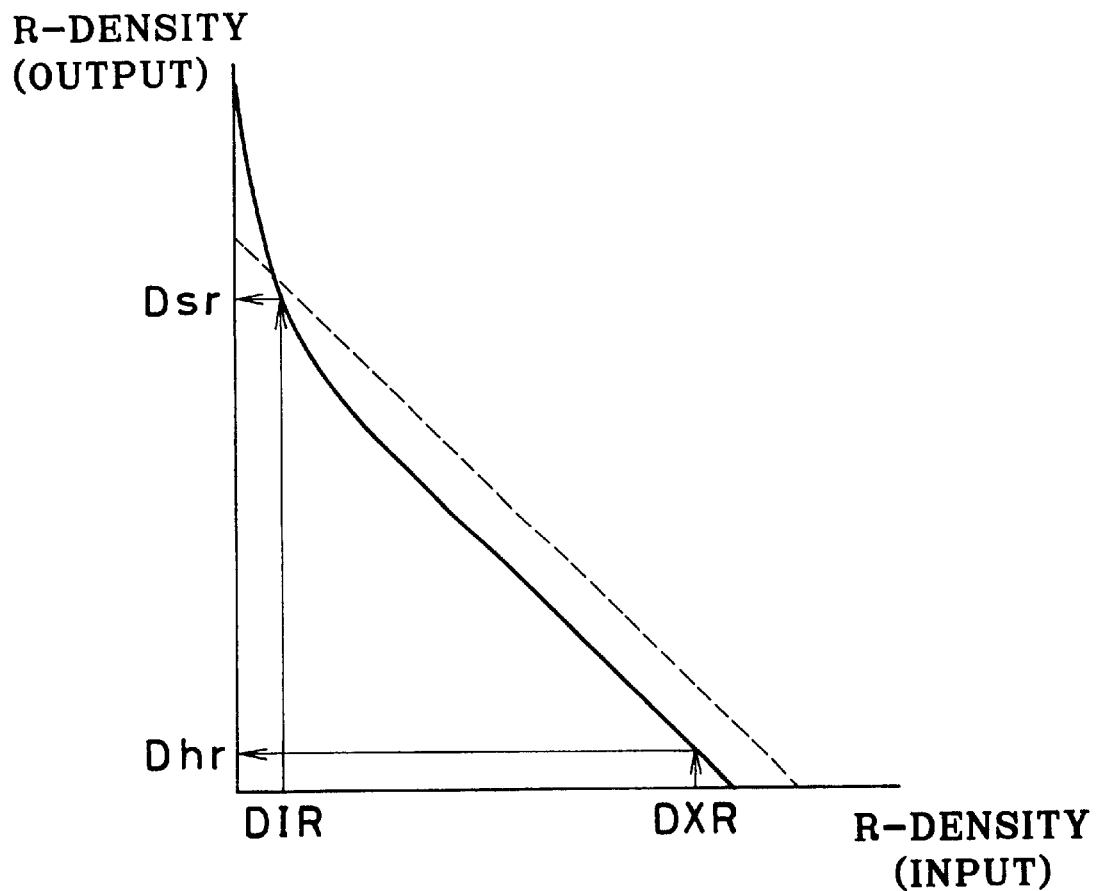
FIG. 7 is a graph illustrating an example of gradation conversion table obtained from the gradation balance conversion table of FIG. 5 and the gradation curve data of FIG. 6.

A gradation conversion condition setup device 18 determines an effective range of the gradation curve data based on the high-density reference balance value DXi and the low-density reference balance value DIi of the original, and composes the gradation curve data of the determined effective range with the gradation balance conversion table as shown in FIG. 5, to produce a gradation conversion table as shown for example by solid line in FIG. 7. Specifically, the input data shown by the horizontal axis of the gradation balance conversion table is replaced by the values shown by the vertical axis of the corresponding characteristic curve. The gradation conversion table shown in FIG. 7 is for an under-exposed original. In comparison with a gradation conversion table for a properly exposed original image, which is shown by dashed lines in FIG. 7 and corresponds to the gradation balance conversion table shown in FIG. 5, the contrast of the solid line curve, i.e. the difference between DXi and DIi, is reduced, so that the reproduced image would be unsharpened in the shadow range. But the tone reproduction would be improved in totality because the low-density range of the original image is enlarged in the recording density.

As shown in FIG. 6, the toe and shoulder of the curve are not proportional, but the image density is compressed in these ranges. The gradation curve varies depending upon the type of recording media or photosensitive layers. Thanks to the latitude of the photographic film and the improved exposure technic of the cameras, the shoulder range is rarely utilized. Because the toe range of the curve has a similar shape to one another, it is unnecessary to store a color specific conversion table to each color, but a generic conversion table is enough. To obtain an exact gradation curve, it is possible to use film densities measured for each type of photographic films. It is alternatively possible to select one of experimentally determined conversion tables as gradation curve data. However, producing a plurality of conversion tables is disadvantageous in view of practical use. It is also possible to use functional equations representative of the characteristic curves in place of the conversion tables.

As an alternative, the same effect is achieved by converting respective values from DIR through DXR of the horizontal axis of FIG. 5, according to the conversion table from Din into Dout of FIG. 6, to produce a gradation conversion table. This modification of the gradation balance conversion table into the gradation conversion table may be carried out for each image, or it is possible to store a plurality of modified conversion tables to select. As the gradation curve data does not require a high accuracy, it is also possible to automatically determine the gradation curve data by a conventional method. For example, a density histogram or density accumulated distribution automatically determined from the pre-scanning data of the original image may be used as the gradation curve data.

Although there are differences in the toe range between the characteristic curves of the different media types, the differences have influence on tone reproduction, but have little influence on color balance. Since the color balance due to the differences in the toe range is corrected, the influence on tone reproduction is reduced. Although it is difficult to automatically determine the shape of characteristic curve of each type of recording media from the image data, predetermined average data can be used as the gradation curve data as the gradation curve data need not be so accurate as the color balance.

An image conversion table producer 21 modifies the gradation conversion table from the gradation conversion condition setup device 18 on the basis of recording conditions from a recording condition memory 22 and the image recording basic amount from the basic amount operation device 12. The recording condition memory 22 sets up parameters necessary for taking account of mechanical differences between individual image input devices 10 and between individual image recording devices 14, as well as respective characteristic curves of recording materials used for recording the reproduced images. The modified gradation conversion table is written as an image data conversion table in a look-up table memory of the image data conversion device 11. Examples of modified gradation conversion tables are shown by chain-dotted lines in FIGS. 8 and 9.

The reason for modifying the gradation conversion table based on the image recording basic amount is as set forth below. If the maximum and minimum reference values to be reproduced, or the highlight and shadow points are correct, there is no need for modification with the image recording basic amount. A typical example of those scenes whose maximum and minimum reference values are correct is a portrait photographed in a studio by a professional photographer. In that case, the highlight point may correspond to a white shirt, and the shadow point may correspond to black hairs. On the contrary, in those scenes which are taken with landscapes in the backgrounds, there may be many subjects that are considered to be highlight points, such as bright sky or clouds, white walls, the outdoors viewed through the window, a near object that reflects flash light. Since it is hard to extract the correct highlight point, such as a white shirt, from those scenes, the modification based on the image recording basic amount is necessary in most cases.

The basic amount operation device 12 calculates the image recording basic amount based on the pre-scanning image data from the image input device 10. The image recording basic amount is a value determined for each original image based on image densities of each original image, i.e., a selected one or more of simple mean values of the pre-scanning image data calculated in each of predetermined areas of the scene, such as an entire area, a specified area, or selected areas. The image recording basic amount may also be mean values weighted according the pixel position, mean values of selected pixels, or weighted mean values of selected pixels.

The image recording basic amount may be determined according to any one of those known methods disclosed in JPA 55-26569, JPA 61-223731, JPA 2-90140, JPA 3-53235 and JPA 5-289207. The image recording basic amount may also be other values that characterize the original image, such as a weighted mean value of a maximum density or a highlight density and a minimum density or a shadow density, a weighted mean value of respective pixels, e.g. a weighted mean value obtained by weighting respective grades of the density histogram, or those values which correspond to a specified or selected frequency in an accumulated density histogram. Preferably, the image recording basic amount may be a value characterizing a main subject density or a value correlating with the main subject density, such as disclosed in JPA 5-100328. Density control values may be used as the image recording basic amount, which can be determined according a known method, for example, as disclosed in JPA 51-138435, JPA 53-145621, JPA 54-28131 and JPA 59-164547.

Figure 8:
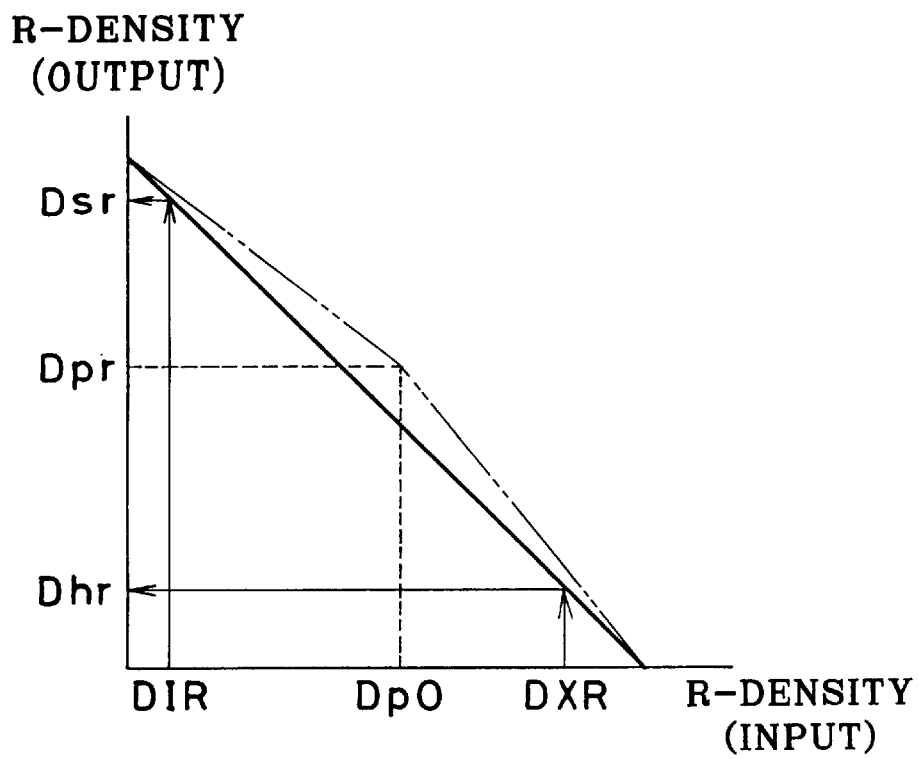
FIG. 8 is a graph illustrating an example of modified gradation conversion table used as an image data conversion table.

To modify the gradation conversion table based on the image recording basic amount, the data of the table is shifted along the vertical axis of the table in accordance with the image recording basic amount. Otherwise, the gradation conversion table may be modified such that a main subject density Dp0 of the original image is converted into a value Dpr necessary for reproducing the main subject at a proper density, as shown in FIG. 8. That is, if the main subject density Dp0 does not correspond to the value Dpr in the gradation conversion table, the curve of the table is modified as shown by chain-dotted lines in FIG. 8.

To determine the main subject area in the original image, a known method of extracting a main subject or human face from the image data such as disclosed in JPA 52-156624, JPA 2-287531 and JPA 4-346332 is applicable. The recording data Dpr for the main subject density of the reproduced image is predetermined for each type of recording media, and stored in the recording condition memory 22. It is possible to write the recording density values Dsi and Dhi for shadow and highlight in the recording condition memory 22, and revise them automatically or manually according to the scene type or preference.

Figure 9:
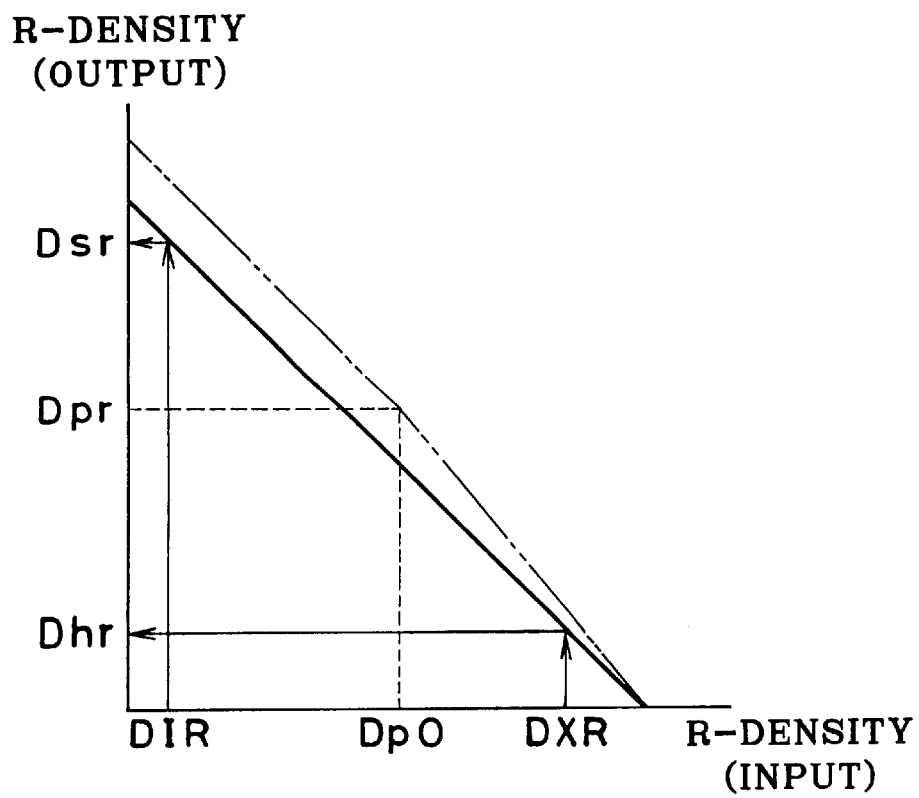
FIG. 9 is a graph illustrating another example of modified gradation conversion table used as an image data conversion table.

Although the modification of the conversion table shown by chain-dotted lines in FIG. 8 is concentrated in a range around the main subject density, it is alternatively possible to modify the curve also in the shadow range, while restraining the modification in the highlight range, as shown in FIG. 9, as the reproduction in the shadow range is not so important. For practical use, either of the modified curves should preferably be shaped into a continuous curve. In this way, the image data conversion table shown by solid lines in FIGS. 5 and 6, which is determined for the reference film type, may be modified depending upon the scene type of the original image, so as to correlate the recording data Dpr for main subject density with the main subject density Dp0 of the image data. The scene type of the original image is discriminated by use of a known method. For example, a great number of scenes are statistically classified into several categories according to patterns, and the original image is classified into one category depending upon its pattern determined based on the pre-scanning image data.

The image recording device 14 converts the recording data from the image data conversion device 11 into image recording control amounts to record an image. It is possible to design the image data conversion device 11 to convert the main scanning image data directly into the image recording control amounts. The image recording device 14 may be a well-known video printer which scans a color photographic paper with light beams to sequentially expose the yellow, magenta and cyan photosensitive layers of the photographic paper.

Figure 10A:
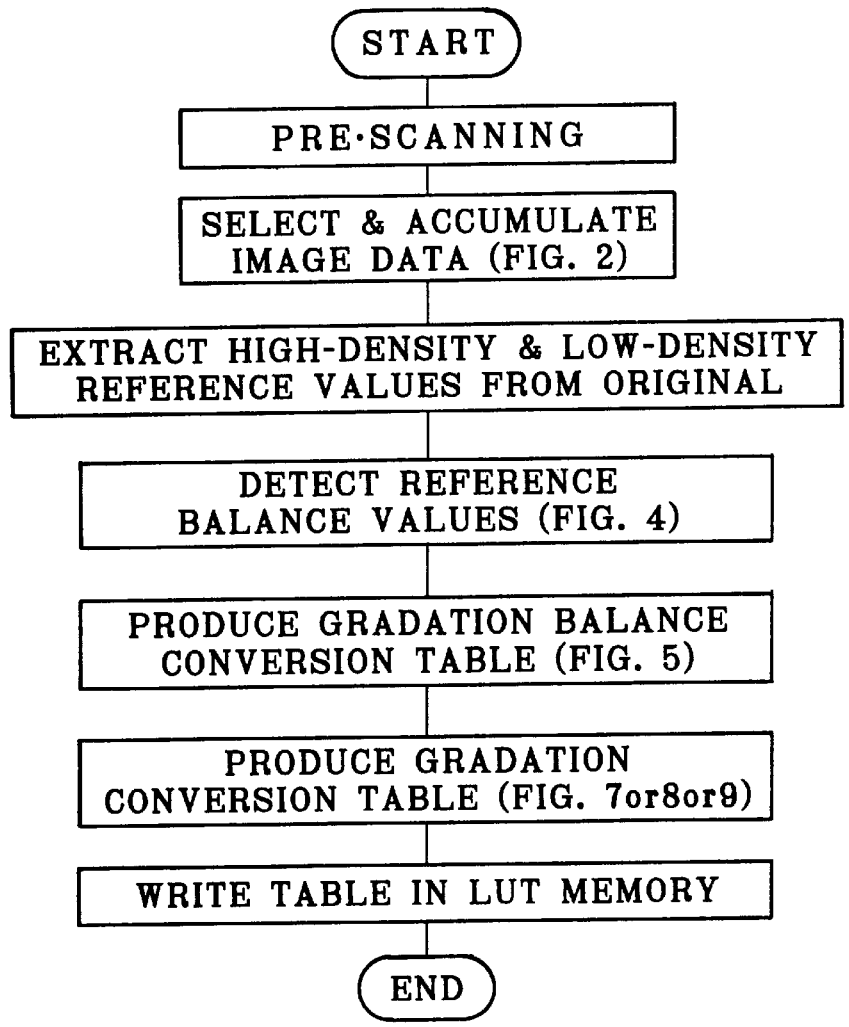
FIG. 10A is a flow chart illustrating a sequence of producing an image data conversion table from image data detected by pre-scanning.
Figure 10B:
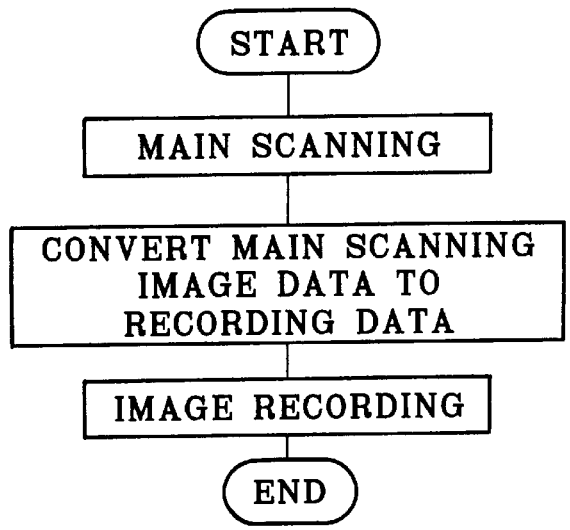
FIG. 10B is a flow chart illustrating a sequence of recording an image based on image data detected by main scanning.

FIG. 10A shows the sequence of producing the gradation conversion table on the basis of pre-scanning data. FIG. 10B shows the sequence of converting main scanning data into recording data to record an image.

In the above described embodiment, the gradation balance data is obtained by accumulating and averaging pre-scanning image data for each film type. It is alternatively possible to pre-scan a plurality of image frames recorded in series with the original on a photographic filmstrip, to obtain the pre-scanning image data for determining the gradation balance data. At that time, all image frames on the filmstrip, or similar image frames on the filmstrip may be pre-scanned. The similarity between the image frames can be detected by statistic analysis of image data in the same way as described above.

Both the pre-scanning and the main scanning may be carried out by a single photometric device, or it is possible to provide separate photometric devices. When using a single photometric device, it is alternatively possible to obtain the pre-scanning image data from the main scanning image data through a pixel density conversion, i.e., by compounding image data of a plurality of pixels so as to reduce the pixel density, i.e. the number of pixels per image, down to hundreds through hundreds thousand of pixels per image.

Figure 11:
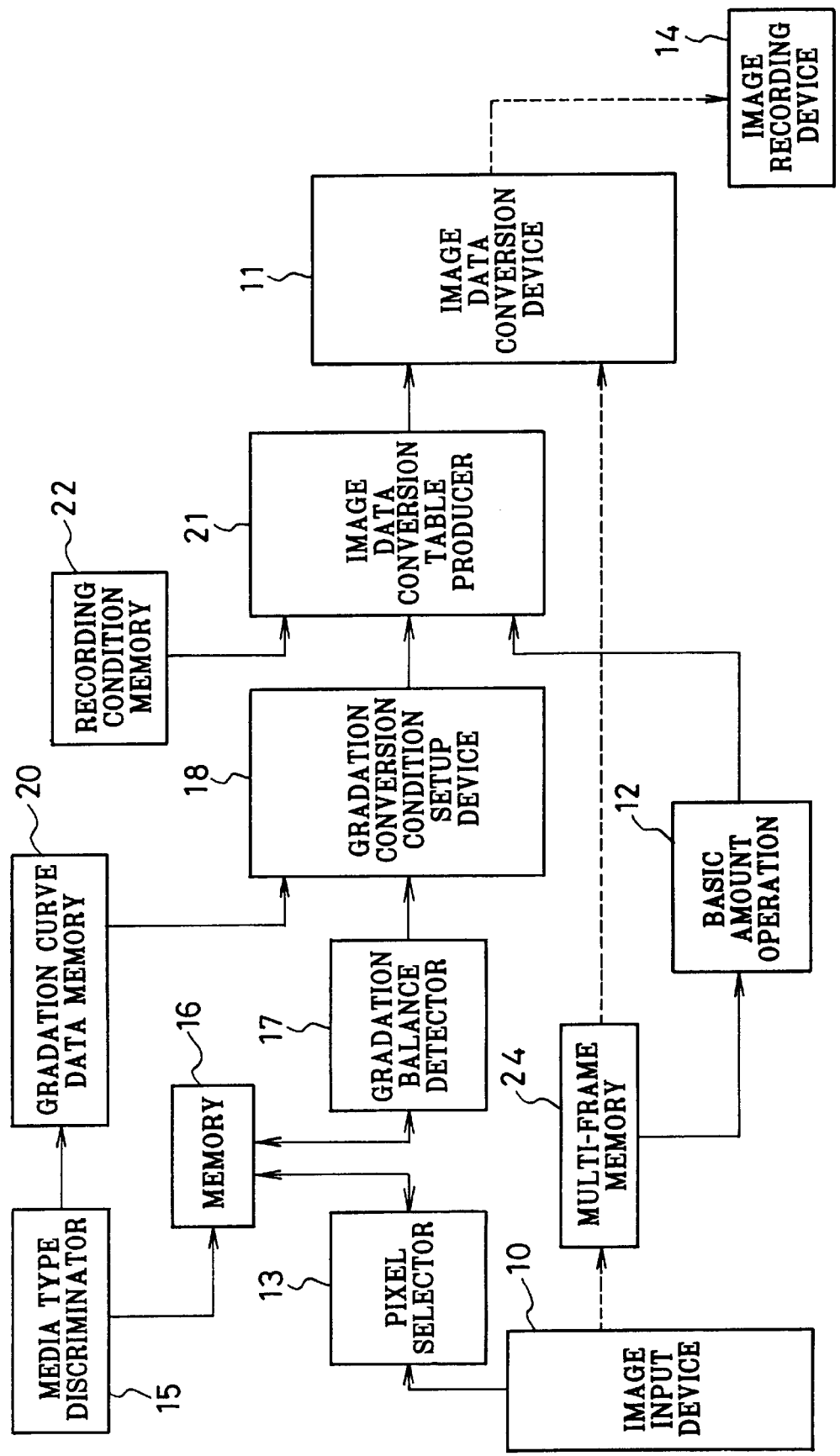
FIG. 11 is a functional block diagram illustrating a digital printer according to another embodiment of the invention.

Alternatively, it is possible to simultaneously pick up image data of a plurality of images in the main scanning mode, and obtain the pre-scanning image data from the main scanning image data by changing pixel density. FIG. 11 shows an embodiment for this method, wherein main scanning image data from a plurality of images is stored in a multi-frame memory 24. Pre-scanning image data is obtained from the main scanning image data through a pixel density conversion or the like. A pixel selector 13 selects those pixels from the pre-scanning image data which satisfy a given standard, so that only the image data of the selected pixels is sent to a memory 16. Calculating an image recording basic amount based on image characteristic values derived from the pre-scanning image data of a plurality of images permits reproducing an image while taking other images of the same series into consideration.

Figure 12:
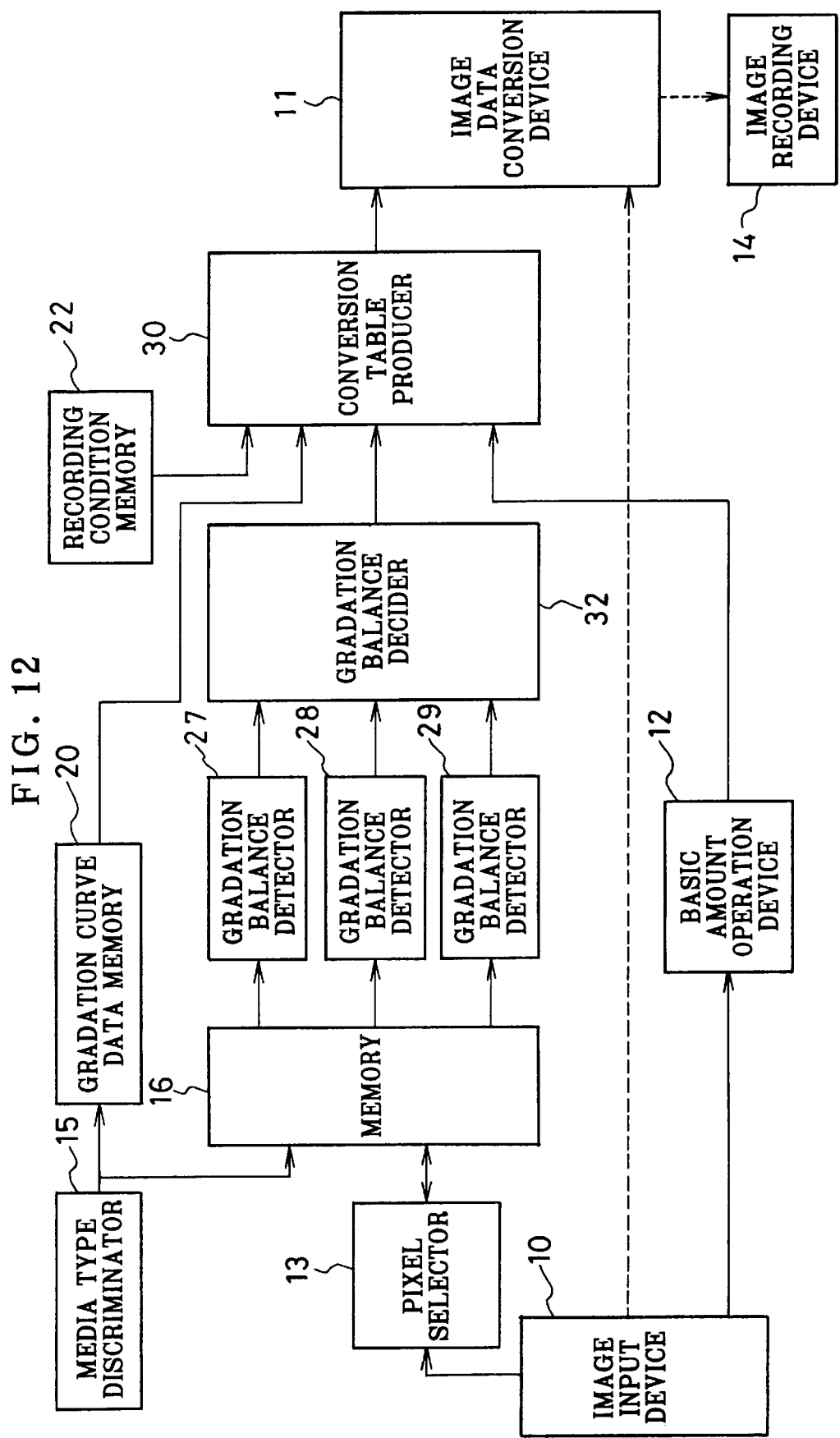
FIG. 12 is a functional block diagram illustrating a digital printer according to a further embodiment of the invention.

FIG. 12 shows a digital printer according to another embodiment of the present invention, wherein an image input device 10, an image data conversion device, a basic amount operation device 12, a pixel selector 13, an image recording device 14, a memory 16, a media type discriminator 15, a gradation curve data memory 20 and a recording condition memory 22 may be equivalent to those of the above embodiments. Therefore, these elements will be described so far as it deemed to be necessary to understand the essential features of this embodiment. Also in FIG. 12, the flow of pre-scanning image data detected through the image input device 10 is shown by solid lines, whereas the flow of main scanning data is shown by dashed lines. It is possible also for this embodiment to obtain the pre-scanning image data from the main scanning data by the image data compression or pixel number reduction.

The memory 16 accumulates red density data and blue density data with reference to green density data of the original images in individual memory locations. The memory location is designated according to the media type. Specifically, the level of the green density of each pixel of the image data is determined, and the red density and the blue density are accumulated according to the density level of the green density, wherein the density levels may be scaled by 0.01 to 0.1. The memory 16 also counts and stores the number of images whose data has been accumulated therein, so as to average the accumulated image data with the number of images. Averaging data of a great number of images will lead to a constant result that corresponds to or approximates to neutral gray. It is possible to convert the approximately neutral to neutral by adding appropriate correction values. Image data accumulation for each media type permits obtaining reliable image data specific to each individual media type, and the reliability increases with the number of images of the accumulated image data.

The pixel selector 16 selects those pixels whose density values are included in a range around the mean density values of image data accumulated in the memory location of the memory 16 for the media type that is designated by the media type signal from the media type discriminator 15. In place of the mean density values, statistically determined values such as those determined according to a method of least squares are usable. The image data selected in this way represents image densities of a limited subject color range around neutral gray.

According to this embodiment, there are a plurality of, e.g. three gradation balance detectors 27, 28 and 29, which detect gradation balance data of the media type of the original on the basis of the mean density values from the memory 16 and/or the pre-scanning image data according to different methods from one another.

Figure 13:
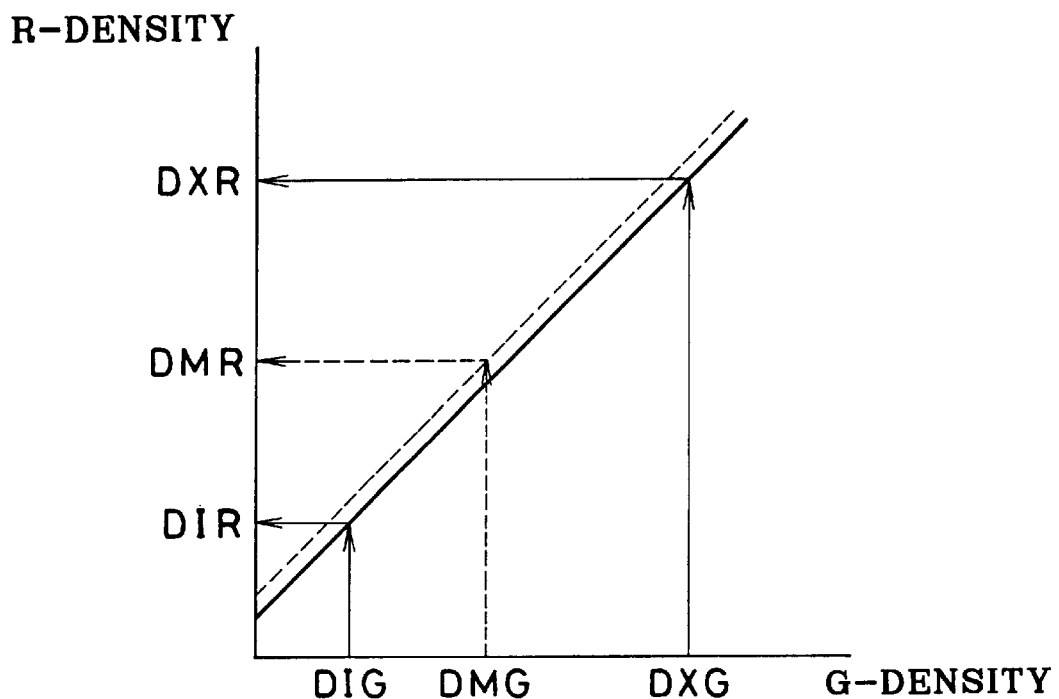
FIG. 13 is a graph illustrating a process of obtaining high-density and low-density reference balance values with use of a gradation balance curve produced from gradation balance data detected through a gradation balance detector, and modifying the gradation balance curve with an average density of the original detected through another gradation balance detector.

The first gradation balance detector 27 detects gradation balance data in the same way as the gradation balance detector 17 of the above embodiments. The gradation balance detector 27 detects gradation balance data of the media type of the original on the basis of accumulated values from the memory 16. The gradation balance data, which consists of a plurality of points as shown in FIG. 3, is modified as a gradation balance curve by smoothing. A solid line in FIG. 13 shows an example of gradation balance curve which represents a relationship between red density and green density of the accumulated image data. In the same way, a gradation balance curve representative of a relationship between blue density and green density of the accumulated image data is produced.

Then, a mean value of maximum densities of three colors of the original image is determined as a high-density reference value "DXG" for green, and a red density "DXR" is determined in association with the reference value DXG according to the gradation balance curve of red relating to green, as is shown in FIG. 13. Also, a blue density "DXB" is determined in association with the reference value DXG according to the gradation balance curve of blue relating to green. These red and blue density values DXR and DXB are for obtaining neutral gray in combination with the green density DXG as the high-density reference value. Therefore, these three values DXG, DXR and DXB will be referred to as high-density reference balance values "DXi", wherein i=R, G or B. In the same way, a mean value of minimum densities of three colors of the original image is determined as a low-density reference value "DIG" for green, to determine red and blue density values "DIR" and "DIB" for obtaining neutral gray in combination with the green density DIG. These three values DIG, DIR and DIB will be referred to as low-density reference balance values "DIi". Hereinafter, the gradation balance detection method in the first gradation balance detector 27 will be referred to as a first method.

Since the gradation balance data detected according to the first method represents average gradation balance of a great number of images, if the image is photographed under daylight or with flash light, this data can be the most precise and reliable gradation balance data. Using this gradation balance data commonly to a series of images permits reproducing images with stable quality. The short-coming of the gradation balance data according to the first method is that it does not apply to those extraordinary cases where the light source is neither daylight nor flash light, or the film does not have an average characteristic curve. The second gradation balance detector 28 is provided for supplementing the above short-coming.

In the second gradation balance detector 28, a high-density reference value and a low-density reference value are obtained for each color from the image data of the original, and these three color reference values are considered to correspond to highlight and shadow gray points of the subject, respectively. High-density and low-density gradation balance data are obtained based on these high-density and low-density three color reference values. It is alternatively possible to obtain gradation balance data from those lines extending through the high-density and low-density reference values of each color, which are considered to represent gray balance lines. The high-density and low-density reference values may be a maximum value and a minimum value obtained from the entire area, a particular area or several divided areas of the original, or density values of highlight and shadow points, e.g. 5% and 95% of the density accumulation histogram.

According to this second method used in the second gradation balance detector 28, it is possible that three color densities obtained as representative values of a neutral gray subject do not actually represent neutral gray. This instability of the gradation balance data would result in variance between the reproduced images. However, the second method permits detecting color balance of those images having extraordinary characteristic curves.

The third gradation balance detector 29 standardizes the image data by use of a standardizing curve, eliminates high-chromatic pixels based on the standardized image data, accumulate the image data exclusive of highchromatic pixels, to obtain the mean density values of the accumulated image data. The standardizing curve is a curve which relates mean density values of image data of a great number of images, which are accumulated for the media type of the original, to reference density values such as green density values or three color mean values. With the standardizing curve, the image data of each original is converted into reference or standardized densities.

Based on the standardized densities obtained by the conversion, a subject color can be forecasted. For example, if there is a large difference between the standardized densities of two colors of a pixel, the pixel may be considered to represent a high-chromatic subject color, so that the pixel should be eliminated before averaging the image data. The standardizing curve represents an average gray density balance of the negative film in general, while the mean density values of the accumulated image data of the original excluding high-chromatic pixels more precisely represent gray density balance of the original.

The third method used in the third gradation balance detector 29 is disclosed in more detail in JPA 3-532235. In place of simple mean density values, highlight image mean density values may be useful for producing a standardizing curve. According to the third method, it is possible to detect three color density balance of the original with such accuracy that is comparable to the gradation balance data obtained in the first gradation balance detector 27. Also, the third gradation balance detector 29 can detect three color density balance of those images which are not taken under daylight or with flash light, or taken on a film having an extraordinary characteristic curve, though the accuracy is not so high compared with the second gradation balance detector 28. The short-coming of the third method is lacking stability, and not directly representing gradation balance. The third gradation balance detector 29 has an intermediate function between the first and second gradation balance detectors 27 and 28.

A gradation balance decider 32, which is connected to the outputs of these gradation balance detectors 27 to 29, selects or combines the data from the gradation balance detectors 27 to 29, to decide on optimum gradation balance data which deemed to be most suitable for reproducing the original image. Selection and combination of the gradation balance data detected according to the various methods make it possible to obtain more accurate and reliable gradation balance data.

The gradation balance decider 32 calculates weighted mean density values DNXi and DNIi according to the following equations (1) and (2), which may be used in producing a gradation balance conversion table:

$$DNXi = KXi \cdot DXi + Kxi \cdot Dxi + \alpha i \quad (1)$$

$$DNIi = KIi \cdot DIi + Kni \cdot Dni + \beta i \quad (2)$$

wherein

KXi, Kxi, KIi, Kni: coefficient (KXi+Kxi=1.0, KIi+Kni=1.0)

DXi: high-density reference balance value of each color derived from accumulated image data of a plurality of image frames, detected by the first gradation balance detector 27;

DIi: low-density reference balance value of each color derived from accumulated image data of a plurality of image frames detected by the first gradation balance detector 27;

Dxi: high-density reference value of each color of an original to be reproduced, detected by the second gradation balance detector 28;

Dni: low-density reference value of each color of the original detected by the second gradation balance detector 28;

$\alpha i$: constant for making a recording density assigned to the high-density reference value appropriate and easy to control; and $\beta i$: constant for making a recording density assigned to the low-density reference value appropriate and easy to control.

Strictly speaking, even the same type photographic films do not always have an identical characteristics because of the aging, differences in manufacturing process, development, cameras and photographic light sources, and so forth. Therefore, it is preferable to determine the coefficients KXi, Kxi, KIi and Kni according to the characteristics of the original. For example, the closer the characteristics of the original to the average characteristics of the plurality of images, the relationships between KXi and Kxi and between KIi and Kni are inclined toward KXi>Kxi, and KIi>Kni. On the contrary, the greater the influence of the photographic light source on the original, the relationships between KXi and Kxi and between KIi and Kni are inclined toward KXi<Kxi, and KIi<Kni.

The gradation balance decider 32 may also modify gradation balance curves obtained based on the gradation balance data from the first or the second gradation balance detector 27 or 28, with the mean density values DMi from the third gradation balance detector 29. FIG. 13 shows an example of this modification, wherein a solid line shows a gradation balance curve showing a relationship between red and green densities as statistic values from the first or the second gradation balance detector 27 or 28, and this curve is shifted as shown by dashed lines so as to across a coordinate point defined by the mean density values DMG and DMR for green and red.

In alternative, the gradation balance curve obtained based on the gradation balance data from the first or the second gradation balance detector 27 or 28 may be modified with a weighted mean value of a mean red density DMR of a great number of images and a mean red density Dmr of the original. In that case, the mean density DMi of the great number of images is obtained by the first gradation balance detector 27, while the mean density Dmi of the original is obtained by the second gradation balance detector 28. According to a further variation, highlight mean density values may be substituted for the simple mean density values.

The gradation balance decider 32 decides the optimum gradation balance data based on weighted mean values of the respective values obtained by the first to third gradation balance detectors 27 to 29. For example, the gradation balance decider 32 compares the balance values from the first gradation balance detector 27 with the mean values from the third gradation balance detector 29, to determine depending upon the difference respective weights or values of coefficients k1, k2 and k3 for weighting the values from the first to third gradation balance detectors. Concretely, if the difference between the gradation balance values of the first gradation balance detector 27 and those of the third gradation balance detector 28 is large, the coefficient k1 for the gradation balance values of the first gradation balance detector 27 is set to zero or a small value, while the coefficient k2 for the gradation balance values of the second gradation balance detector 28 is set to a larger value. For example, the coefficients are set to be k1: k2: k3=0.2: 0.5: 0.3, wherein k1+k2+k3=1.0.

If there is a differences between the gradation balance data obtained for each media type and those obtained from a series of images recorded on the same type film including the original to be reproduced, the decider 32 adopts the image data of the series of images, instead of the gradation balance data of the media type. Of the gradation balance data of the first gradation balance detector 27 and those of the third gradation balance detector 29 approximate to each other, and differ from the gradation balance data of the second gradation balance detector 28, the gradation balance decider 32 decides that the second gradation balance detector 28 does not extract the gray area, and then sets the weighting coefficient k2 for the second gradation balance detector 28 to a small value or zero.

If the original is photographed by a camera having a photographic light source detector, and it is determined that the original is photographed under light other than daylight and flash light, the gradation balance decider 32 enlarges the coefficient k2 for the gradation balance data of the second gradation balance detector 28, and reduces the coefficients k1 and k3 for the first and third gradation balance detectors 27 and 29 to smaller values or zero.

In case of an under-exposed negative original, the low-density reference values detected in the second gradation balance detector 28, such as the minimum density or the shadow point density, is equal to or affected by the base density of the negative film, so that the low-density reference values do not always represent a neutral color. Therefore, it is preferable for the under-exposed negative original to weight the low-density reference values less than the high-density reference values.

The gradation balance data determined optimum by the gradation balance decider 22 is sent to a conversion table producer 30. The conversion table producer 30 produces an image data conversion table from the gradation balance data, gradation curve data read out from the gradation curve data memory 20, and an image recording basic amount calculated by the basic amount operation device 12.

Figure 14:
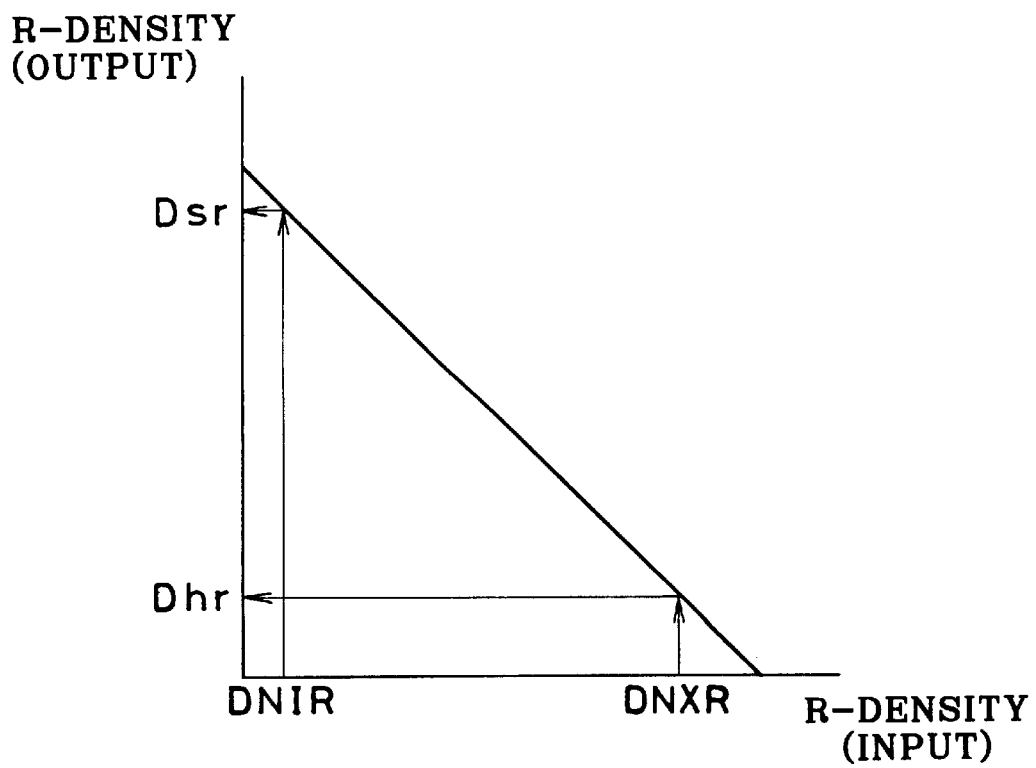
FIG. 14 is a graph illustrating an example of gradation balance conversion table.

The conversion table producer 30 first produces a gradation balance conversion table for each color by connecting two coordinate points which are defined by the weighted mean value DNXi and a highlight recording density "Dhi", and the weighted mean value DNIi and a shadow recording densities "Dsi", respectively. FIG. 14 shows an example of the gradation balance conversion table for red. In FIG. 14, Dhr and Dsr represent a highlight level and a shadow level of the recording data for red, which are predetermined to be related to the values DNXR and DNIR of the image data for red. The gradation balance conversion table of FIG. 14 is modified with the gradation curve data in the same way as in the gradation conversion condition setup device 18, for the same reason as described above.

The gradation curve data may be a conversion table as shown in FIG. 6, that corresponds to the characteristic curve of a photographic film, and converts input data "Din" into output data "Dout". The gradation curve data is written for each type of recording media in the gradation curve data memory 20, and is selected in response to the media type signal from the media type discriminator 15. The selected gradation curve data is sent to the gradation conversion condition setup device 18.

Figure 15:
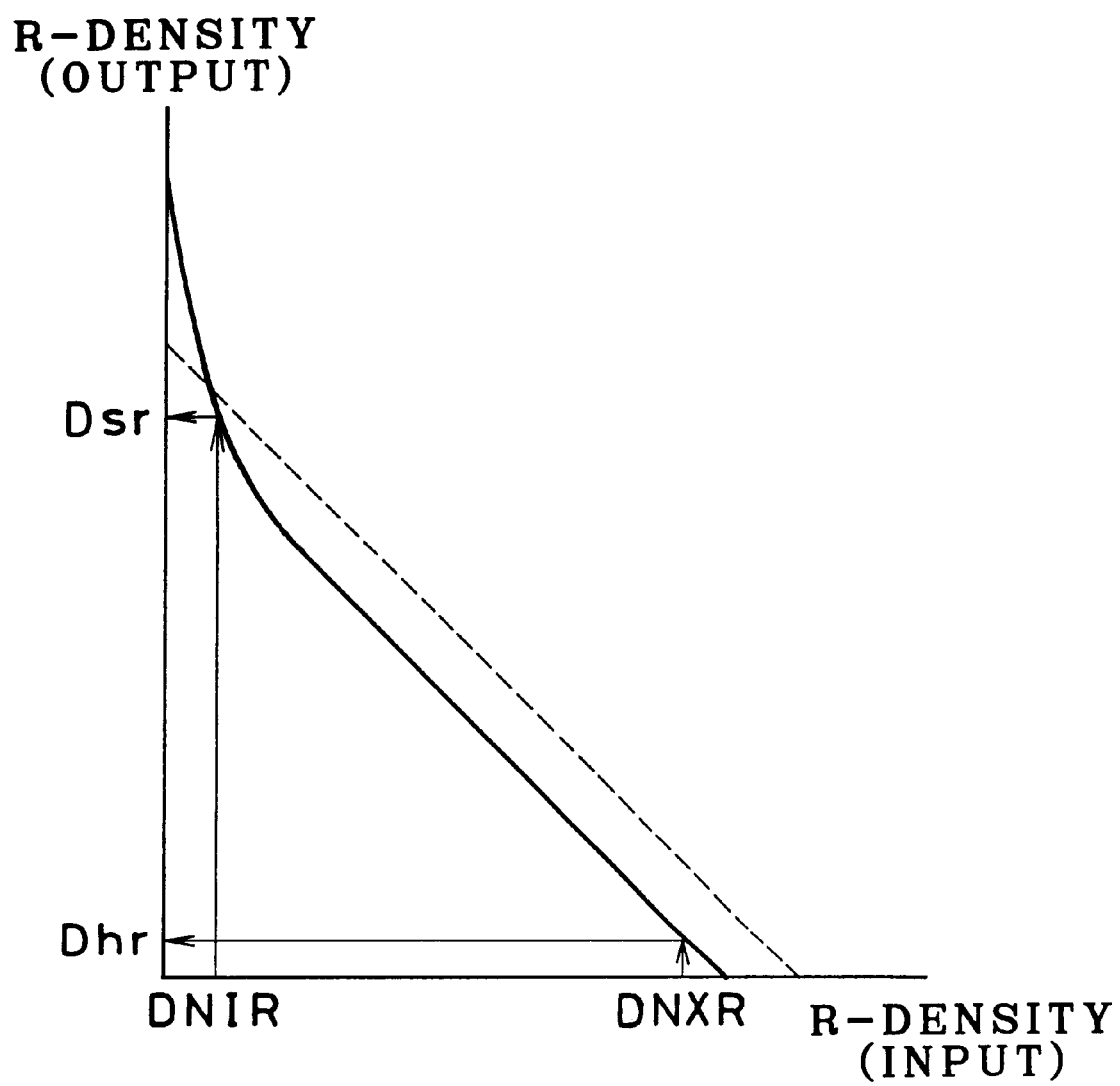
FIG. 15 is a graph illustrating an example of gradation conversion table produced from the gradation balance conversion table of FIG. 14 and the gradation curve data of FIG. 6.

The conversion table producer 30 determines an effective range of the gradation curve data based on the high-density reference balance value Dxi and the low-density reference balance value Dni of the original, and composes the gradation curve data of the determined effective range with the gradation balance conversion table as shown in FIG. 14, to produce a gradation conversion table as shown, for example, by solid line in FIG. 15. The gradation conversion table shown in FIG. 15 is for an under-exposed original. In comparison with a gradation conversion table for a properly exposed original, which is shown by dashed lines in FIG. 15 and corresponds to the gradation balance conversion table shown in FIG. 14, the contrast of the solid line curve, i.e. the difference between DNXi and DNIi, is reduced, so that the reproduced image would be unsharpened in the shadow range. But, the tone reproduction would be improved in totality because the low-density range of the original image is enlarged in the recording density.

If necessary, the gradation conversion table is modified on the basis of recording conditions from the recording condition memory 22 and the image recording basic amount from the basic amount operation device 12, in the same way as described in the above embodiments, particularly with reference to FIGS. 8 and 9. The modified gradation conversion table is written as an image data conversion table in a look-up table memory of the image data conversion device 11.

Figure 16:
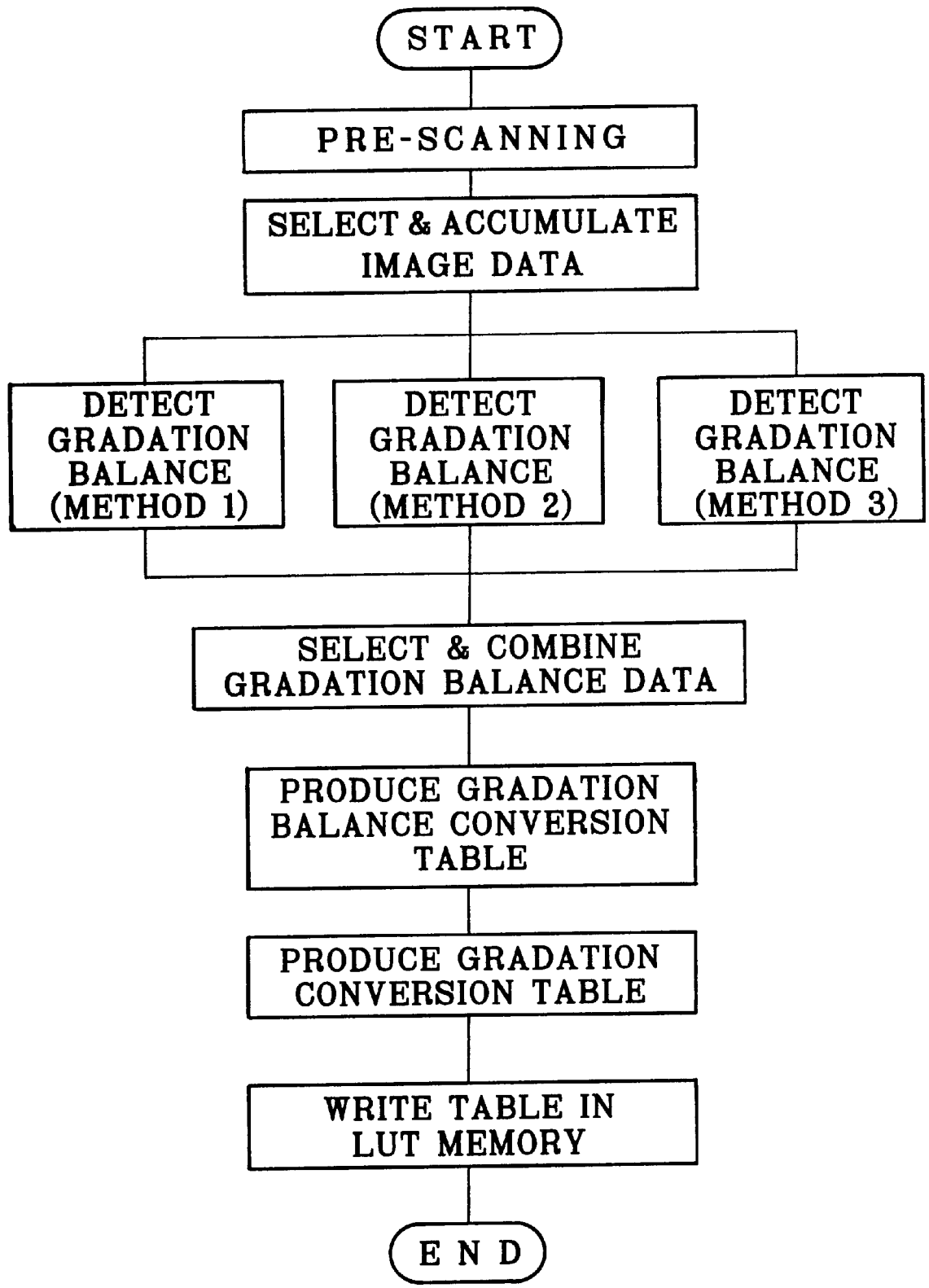
FIG. 16 is a flow chart illustrating a sequence of producing an image data conversion table from image data detected by pre-scanning.

FIG. 16 shows the sequence of producing the gradation conversion table on the basis of the pre-scanning image data according to the embodiment of FIG. 12. The image data conversion device 11 converts the main scanning image data into recording data according to the image data conversion table. The image recording device 14 converts the recording data from the image data conversion device 11 into image recording control amounts to record an image. It is possible to design the image data conversion device 11 to convert the main scanning image data directly into the image recording control amounts. The image recording device 14 may be a well-known video printer which scans a color photographic paper with light beams to sequentially expose the yellow, magenta and cyan photosensitive layers of the photographic paper.

Instead of producing a gradation conversion table from the gradation curve data and the gradation balance data, it is possible to produce an image data conversion table from the gradation curve data and the image recording basic amount. Thus, various combinations of conversion tables, or separation or integration of conversion tables are possible in accordance with correction factors, without departing from the scope of the invention.

Figure 17:
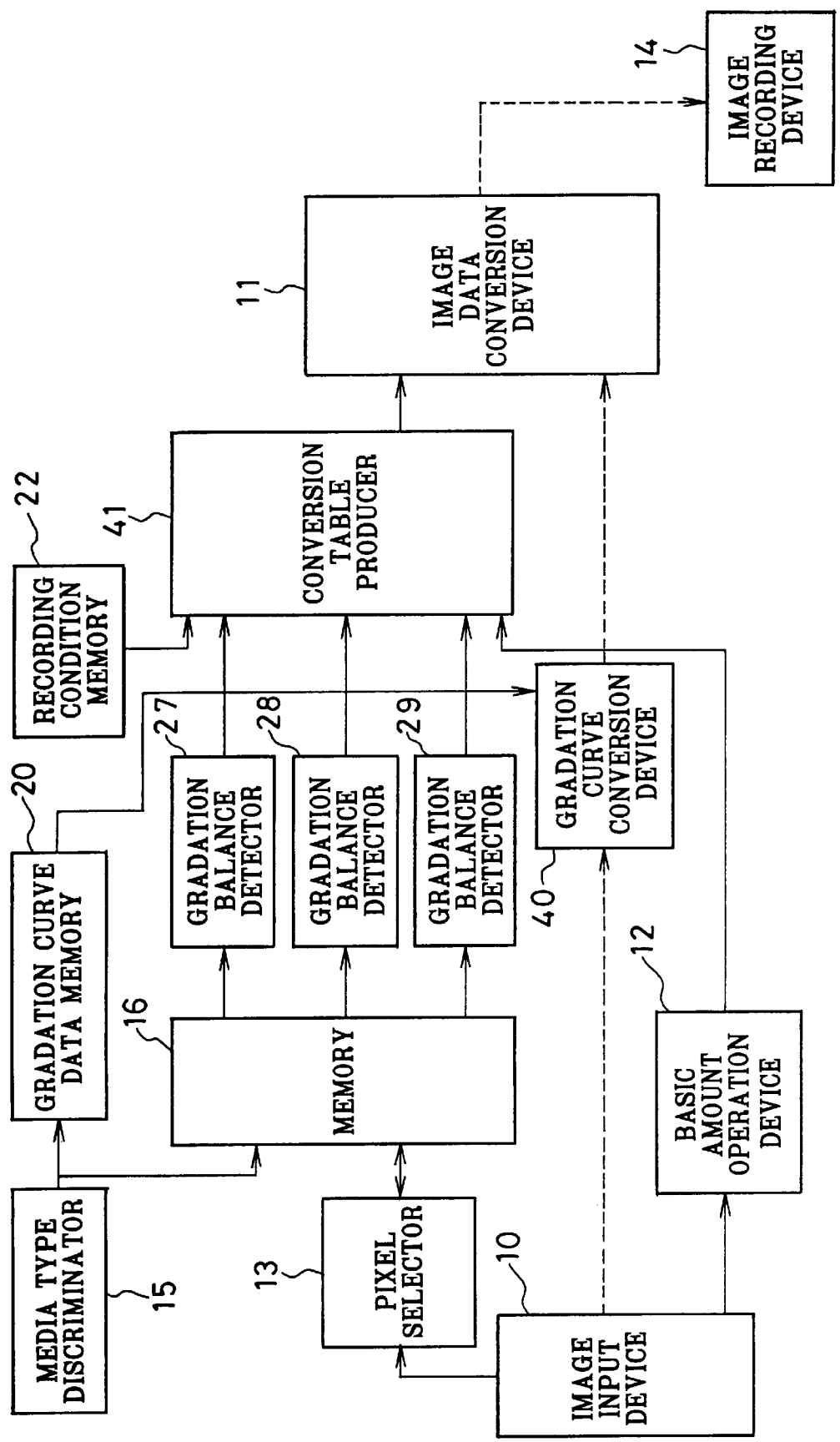
FIG. 17 is a functional block diagram illustrating a digital printer according to still another embodiment of the invention.

For example, it is possible to provide a gradation curve conversion device 40, as shown in FIG. 17, to convert main scanning image data based on the gradation curve data so as to eliminate non-linearity of the photographic films. Thereafter, the main scanning image data is converted into recording data through an image data conversion device 11. In that case, a conversion table producer 41 produces an image data conversion table based on a gradation balance conversion table obtained by selecting and combining gradation balance data from gradation balance detectors 27 to 29, and an image recording basic amount from a basic amount operation device 12. The gradation curve conversion device 40 eliminates only non-linearity of the photographic films from the main scanning image data, not corrects the gradation balance of the characteristic curves. According to the present embodiment, the gradation curve data is not used to correct the gradation balance or color balance, but is used as representative data.

Although the second gradation balance detector 28 determines maximum and minimum values of the entire area of the image, or those of a specified image area or several divisional image areas, or highlight and shadow points as high-density and low-density reference values, it is possible to determine the maximum and minimum values or highlight and shadow points from those image portions which are to be actually reproduced as white and black, not from those portions representative of the light source or mirror-reflected light. For example, only when the size of the image portion whose density is the maximum or the minimum of the image, or where the highlight point or the shadow point is located, is above a given value, e.g. 3% of the entire image area, the maximum or minimum density value or the highlight or shadow point is considered to be effective as the reference value. It is also possible to determine the total color construction of the image, the type of light source, and whether it is a gray subject portion or not, from characteristic values of a series of film images, and select the maximum or minimum value or the highlight or shadow point depending upon the results of the determination. It is further possible to change the weighting coefficient relative to the other gradation balance data, in accordance with the results of the determination. It is to be noted that the present invention should not be limited to the above described first to third gradation balance data detection methods used in the three gradation balance detectors 27 to 29, and there may be two or more than three gradation balance detectors.

Selecting and combining gradation balance data including three color density balance values and approximate values, which are obtained through a plurality of different methods, can eliminate short-coming of each individual method and permits obtaining accurate and stable tone reproduction conditions suitable for reproducing high-quality images with no color variance.

In the embodiments shown in FIGS. 1 and 11, high-density reference balance values DXi and low-density reference balance values DIi correspond three color densities of neutral gray at the high-density reference value and the low-density reference value of the original image. However, in place of these reference balance values DXi and DIi, it is possible to use weighted mean values DNXi and DNIi which are determined according to the above equations (1) and (2).

Weighting at least two reference values, which are obtained from accumulated image data of a great number of images relating to one another, and at least two reference values, which are obtained from image data of the original to be reproduced, with different coefficients from each other permits correcting the difference of the characteristics of the individual original from average characteristics of the great number of images, and thus setting up an optimum gray balance, i.e., neutral three color densities for reproducing gray.

Although high-density and low-density reference balance values are determined for two reference values of each color, the number of the reference balance values is not to be limited to two. For example, an average density of the image or an intermediate density between a maximum density and a minimum density of the image may be designated as a middle-density reference value, to determine middle-density reference balance values based on the middle-density reference value.

According to the above embodiment, the gradation is uniformly defined by a maximum reference point and a minimum reference point, or a highlight point and a shadow point. However, gradation data can be insufficient due to insufficient originals or insufficient gradation of the recording medium, e.g. when the gradation is hard in totality. In that case, it is possible to correct those recording densities to some extent, which correspond to a maximum reference point and a minimum reference point, or a highlight point and a shadow point, when producing a gradation balance table. But this correction is not enough. Therefore, it is preferable to make it possible to correct the image data conversion table by multiplying converted data, i.e. recording data with coefficients, so that the total gradation may be converted. The coefficients may be determined by an external device and entered through a manual input device, or may automatically be given for each image.

The image data conversion table producer 21 or the conversion table producer 30 or 41 may include several kinds of processing for media conversion to solve problems that may occur when making a hard copy from an image on photographic film, e.g. lightness reproduction, hue, or chroma reproduction is compressed, or a particular color or highlight is enhanced. In an alternative, a media conversion device may be provided in the gradation conversion condition setup device 18 or in connection with the image data conversion table producer 21. The image data conversion table producer 21 may also include other conventional image processing steps, such as image enhancement, pseudo contour elimination, noise elimination, and calibration of mechanical tolerance or variance.

In this embodiment, it is possible to simultaneously pick up image data of a plurality of images in the main scanning mode, and obtain the pre-scanning image data from the main scanning image data by changing pixel density. In that case, the main scanning image data picked up from a plurality of images is stored in a not-shown image memory, and pre-scanning image data is obtained from the main scanning image data through a pixel density conversion or the like.

The term "density" in the description includes not only optical density but also a converted value that corresponds to lightness, a photometric output value from the original, dot percentage, and so forth. Also, an anti-logarithmic value may be applicable. The present invention is most preferably applicable to originals on negative films, but also applicable to positive images on reversal films or reflective originals.

The image recording device 14 may be constituted of a line or area printer such as a liquid crystal or CRT printer, instead of the beam printer. The recording material for recording the reproduced image is not to be limited to photographic paper, but may be thermosensitive recording material. The present invention is also applicable to ink- or wax-transfer thermal printers, ink-jet printers, toner-transfer printer.

In the above embodiments, image data is sorted according to green density to obtain gradation balance data. But it is possible to use another color, a mean value of three colors: (R+G+B)/3, or a weighted mean value of three colors: (kR·R+kG·G+kB·B)/(kR+kG+kB), as the standard for image data sorting. Also, a color difference value or color ratio relative to the green density or to the three color mean value, such as "R−G" or "B−G", is applicable as the standard. If the three color mean value is used as the standard for image data sorting, also high-density and low-density reference values should be mean values of three colors. In this way, the method of determining the respective reference values should be changed depending upon what is used as the standard.

It is also possible to use a highlight point and a shadow point, e.g. points at 5% and 95% of a density accumulation histogram, or other density values as high-density and low-density reference values of the original. It is possible to extract a main subject, and determine based on the density of the main subject those density values to be reproduced as highlight and shadow points, and use them as high-density and low-density reference values. In other words, the high-density and low-density reference values should substantially represent white and black in the reproduced image, and various methods for determining these values are possible without departing from the scope of the present invention.

Instead of accumulating image data of a great number of images for each media type, it is possible to accumulate image characteristic values and derive representative values for each media type from the accumulated image characteristic values. Based on the representative values, high-density reference representative values and low-density reference representative values are determined in correspondence with high-density and low-density reference values of the original. Then, an image data conversion condition is determined for each color on the basis of the high-density and low-density reference representative values of each color and recording density values for these two representative values. As the image characteristic values, there are at least those reference values which are obtained from maximum and minimum values of each color of the image (JPA 6-242521, JPA 6-242522), and/or from density values of highlight and shadow points, e.g. 5% and 95% of an accumulated density histogram (JPA 60-37878, JPA 63-61592, JPA 22-36786, JPA 3-219777, JPA 6-242522). These reference values are used as highlight reference values and shadow reference values. These reference values have conventionally been widely used as values representative of gray points. The present invention derives reference values for each image from statistic values, e.g. mean values or least square approximate values obtained from reference values of a great number of different density levels. The reference values obtained according to the present invention are superior in accuracy and stability compared with the conventional methods.

It is also possible to accumulate or store image characteristic values of those pixels having image densities within a range around a line which connects a high-density reference value to a low-density reference value. Moreover, it is possible to accumulate conversion conditions used for a great number of images of the same type film, instead of accumulating image data or image characteristic values, to derive representative values for each media type from the accumulated conversion conditions. The conversion conditions may be those extending through a highlight reference value and/or a shadow reference value of the image. The conversion conditions to be accumulated may be obtained from those pixels which are selected according to a predetermined standard. It is preferable to pre-scan a great number of images and accumulate conversion conditions of these images, so as to predetermine the pixel selection standard before the pre-scanning or main scanning of the originals to be actually reproduced.

In the above embodiments, image data mean values or average image data is obtained by accumulating image data of a plurality of images and dividing the accumulated image data by the number of accumulated images, it is alternatively possible to individually store image data of each image. It is also possible to use statistic values such as least square approximate values in place of the mean values. It is further possible to obtain linear or multi-dimensional functions according to multiple regression analysis.

It is possible to convert image data into lightness or luminance signal and chrominance signal, to select those pixels which belong to a proximate range of a color space defined by the luminance and chrominance signals, so as to store or accumulate image data of the selected pixels. Alternatively, it is possible to select those pixels which belong to a proximate range on a chromaticity coordinates defined by the chrominance signals.

As recording media, not only color photographic films, but also memory cards or floppy discs having image signals recorded by a digital camera or the like are applicable. The present invention is applicable to positive original images as well as negative original images.

Thus, the present invention should not be limited to the above described embodiments but, on the contrary, various modifications are possible to those skilled in the art without departing from the scope of the invention as claimed in the appended claims.

What is claimed is:

1. An image data conversion method for a digital printer, for converting image data of an original frame into recording data to record a reproduced image as a hard copy, comprising the steps of:

A. accumulating image data, said image data comprising data obtained from at least a plurality of frames which are recorded on different recording media from said original frame, said different recording media being of the same type of recording medium as said original frame, said image data being pixel data of only neutral gray or approximately neutral gray;

B. deriving representative values from said accumulated image data, said representative values characterizing said type of recording medium, said representative values being gray gradation balance data;

C. producing image data conversion conditions from said representative values; and D. converting said image data of said original frame according to said image data conversion conditions.

2. An image data conversion method as claimed in claim 1, wherein said step A comprises the step of pre-scanning a great number of images to obtain said image data to be accumulated from said plurality of frames, prior to main scanning said original frame for obtaining said image data to be converted.

3. An image data conversion method as claimed in claim 1, wherein said image data includes pixel data of those pixels which belong to an approximate range around a line extending through a highlight reference value and a shadow reference value of said original frame.

4. An image data conversion method as claimed in claim 1, wherein said step C comprises the steps of:

obtaining for each color a high-density reference value and a low-density reference value of said original frame;

obtaining for each color at least a high-density reference representative value and a low-density reference representative value from said representative values, in correspondence with said high-density and low-density reference values of said original frame; and determining said image data conversion conditions based on said high-density and low-density reference representative values and recording densities to be assigned to said high-density and low-density reference representative values.

5. An image data conversion method as claimed in claim 4, wherein said high-density and low-density reference representative values of three colors correspond to neutral three color densities at highlight and shadow points, respectively.

6. An image data conversion method as claimed in claim 1, wherein said recording medium of said original frame is a color photographic film.

7. An image data conversion method as claimed in claim 1, wherein said recording medium of said original frame is an image signal recording device from which said image data of said original frame is readable.

8. An image data conversion method for a digital printer, for converting image data of an original frame into recording data to record a reproduced image as a hard copy, comprising the steps of:

A. accumulating image characteristic values obtained from a great number of image frames, each of said great number of image frames having a respective recording medium type, said image characteristic values being sorted according to said respective recording medium type;

B. deriving representative values from those of said characteristic values accumulated for only the same type recording medium as said original frame, said representative values being gray gradation balance data;

C. producing image data conversion conditions from said representative values; and D. converting said image data of said original frame according to said image data conversion conditions.

9. An image data conversion method as claimed in claim 8, wherein said step A comprises the step of scanning the great number of image frames prior to scanning said original frame, to obtain said image characteristic values to be accumulated.

10. An image data conversion method as claimed in claim 8, wherein said step C comprises the steps of obtaining for each color at least a high-density reference representative value and a low-density reference representative value from said representative values, said high-density and low-density reference representative values correspond to high-density and low-density reference values of said original frame; and determining said image data conversion conditions based on said high-density and low-density reference representative values and recording densities to be assigned to said high-density and low-density reference representative values.

11. An image data conversion method as claimed in claim 8, wherein said image characteristic values to be accumulated are highlight reference values or shadow reference values of said original frame.

12. An image data conversion method as claimed in claim 8, wherein said recording medium of said original frame is a color photographic film.

13. An image data conversion method as claimed in claim 8, wherein said recording medium of said original frame is an image signal recording device from which said image data of said original frame is readable.

14. An image data conversion method for a digital printer, for converting image data of an original frame into recording data to record a reproduced image as a hard copy, comprising the steps of:

A. accumulating conversion conditions obtained for a great number of image frames, each of said great number of image frames having a respective recording medium type, said conversion conditions being sorted according to said recording medium type;

B. deriving representative values from those of said conversion conditions accumulated for only the same type recording medium as said original frame, said representative values being gray gradation balance data;

C. producing image data conversion conditions from said representative values; and D. converting said image data of said original frame according to said image data conversion conditions.

15. An image data conversion method as claimed in claim 14, wherein said step A comprises the step of scanning the great number of image frames prior to scanning said original frame, to obtain said conversion conditions to be accumulated.

16. An image data conversion method as claimed in claim 14, wherein said conversion conditions to be accumulated are those conversion conditions which extend through highlight reference values or shadow reference values of said original frame.

17. An image data conversion method as claimed in claim 14, wherein said recording medium of said original frame is a color photographic film.

18. An image data conversion method as claimed in claim 14, wherein said recording medium of said original frame is an image signal recording device from which said image data of said original frame is readable.

19. An image data conversion method for a digital printer, for converting image data of an original frame recorded on a color photographic film into recording data to record a reproduced image on a recording material, said method comprising the steps of:

A. obtaining, by use of different methods, a variety of gradation balance data from image data of a plurality of image frames recorded on color photographic films;

B. processing said variety of gradation balance data to obtain optimum gradation balance data;

C. obtaining an image data conversion table based on said optimum gradation balance data; and D. converting said image data of said original frame through said image data conversion table.

20. An image data conversion method as claimed in claim 19, wherein said steps A and B comprise the steps of:

selecting pixels from a great number of image frames recorded on the same type color photographic film as said original frame, according to a predetermined standard;

accumulating image data of said selected pixels;

obtaining first gradation balance data from representative values of said accumulated image data;

obtaining second gradation balance data from said image data of said original frame; and determining said optimum gradation balance data based on weighted mean values of representative values of said first and second gradation balance data.

21. An image data conversion method as claimed in claim 19, wherein said step A comprising the steps of:

obtaining representative values from image data of a great number of image frames recorded on the same type color photographic film as said original frame;

obtaining for each color a high-density reference value and a low density reference value of said original frame;

obtaining for each color a high-density reference representative value and a low-density reference representative value from said representative values, in correspondence with said high-density and low-density reference values of said original frame;

obtaining first gradation balance data which assigns said high-density and low-density reference representative values to conversion values to reproduce at predetermined color densities;

obtaining second gradation balance data which assigns at least one of said high-density and low-density reference values of each color of said original frame to a conversion value to reproduce at a predetermined color density;

selecting pixels from said original frame based on a standard defined by said representative values;

averaging image data of said selected pixels; and obtaining third gradation balance data which assigns said average image data to a conversion value of each color to reproduce at a predetermined color density.

22. An image data conversion method as claimed in claim 21, wherein said step B comprises the steps of determining said optimum gradation balance data based on weighted mean values of said first to third gradation balance data.

23. An image data conversion method as claimed in claim 19, wherein said steps A and B comprise the steps of:

obtaining representative values from image data of a great number of image frames recorded on the same type color photographic film as said original frame;

obtaining for each color a high-density reference value and a low density reference value of said original frame;

obtaining for each color a high-density reference representative value and a low-density reference representative value from said representative values, in correspondence with said high-density and low-density reference values of said original frame;

obtaining first gradation balance data which assigns said high-density and low-density reference representative values of each color to conversion values to reproduce at respectively predetermined color densities;

selecting pixels from said original frame based on a standard defined by said representative values;

averaging image data of said selected pixels;

obtaining second gradation balance data which assigns said average image data to a conversion value of each color to reproduce at a predetermined color density;

providing a gradation balance conversion table for each color based on said first gradation balance data by connecting two coordinate points which are defined by said high-density reference representative value and said conversion value assigned to said high-density reference representative value, on one hand, and said low-density reference representative value and said conversion value assigned to said low-density reference representative value, on the other hand;

shifting said gradation balance conversion table based on said second gradation balance data, so as to extend across a coordinate point which is defined by said average image data and said conversion value assigned to said average image data; and determining said optimum gradation balance data based on said shifted gradation balance conversion table.

24. An image data conversion method as claimed in claim 19, wherein said steps A and B comprise the steps of:

obtaining representative values from image data of a great number of image frames recorded on the same type color photographic film as said original frame;

obtaining for each color a high-density reference value and a low density reference value of said original frame;

obtaining first gradation balance data which assigns said high-density and low-density reference values of each color of said original frame to conversion values to reproduce at respectively predetermined color densities;

selecting pixels from said original frame based on a standard defined by said representative values;

averaging image data of said selected pixels; and obtaining second gradation balance data which assigns said averaged image data to a conversion value of each color to reproduce at a predetermined color density;

providing a gradation balance conversion table for each color based on said first gradation balance data by connecting two coordinate points which are defined by said high-density reference value and said conversion value assigned to said high-density reference value, on one hand, and said low-density reference value and said conversion value assigned to said low-density reference value, on the other hand;

shifting said gradation balance conversion table based on said second gradation balance data, so as to extend across a coordinate point which is defined by said average image data and said conversion value assigned to said average image data; and determining said optimum gradation balance data based on said shifted gradation balance conversion table.

25. An image data conversion method as claimed in claim 19, wherein said same type color photographic film includes a filmstrip or a series of filmstrips containing a great number of image frames, and all or part of said great number of image frames are used for gradation balance detection.

26. An image data conversion method for a digital printer, for converting image data of an original frame recorded on a color photographic film into recording data to record a reproduced image on a recording material, said method comprising the steps of:

A. obtaining gradation curve data to determine lightness of said reproduced image throughout an entire image density range of said reproduced image;

B. obtaining gradation balance data which is to determine three color density balance for gray of said reproduced image throughout the entire image density range of said reproduced image, on the basis of image data of said original frame and image data of a plurality of image frames recorded on color photographic films, by use of different kinds of methods;

C. selecting or combining said gradation balance data to derive optimum gradation balance data;

D. obtaining an image data conversion table based on said optimum gradation balance data and said gradation curve data; and E. converting said image data of said original frame through said image data conversion table.

27. An image data conversion method as claimed in claim 26, wherein said steps A and B comprise the steps of:

selecting pixels from a great number of image frames recorded on the same type color photographic film as said original frame, according to a predetermined standard;

accumulating image data of said selected pixels;

obtaining first gradation balance data from representative values of said accumulated image data;

obtaining second gradation balance data from said image data of said original frame; and determining said optimum gradation balance data based on weighted mean values of representative values of said first and second gradation balance data.

28. An image data conversion method as claimed in claim 26, wherein said step A comprising the steps of:

obtaining representative values from image data of a great number of image frames recorded on the same type color photographic film as said original frame;

obtaining for each color a high-density reference value and a low density reference value of said original frame;

obtaining for each color a high-density reference representative value and a low-density reference representative value from said representative values, in correspondence with said high-density and low-density reference values of said original frame;

obtaining first gradation balance data which assigns said high-density and low-density reference representative values to conversion values to reproduce at predetermined color densities;

obtaining second gradation balance data which assigns at least one of said high-density and low-density reference values of each color of said original frame to a conversion value to reproduce at a predetermined color density;

selecting pixels from said original frame based on a standard defined by said representative values;

averaging image data of said selected pixels; and obtaining third gradation balance data which assigns said average image data to a conversion value of each color to reproduce at a predetermined color density.

29. An image data conversion method as claimed in claim 26, wherein said step B comprises the steps of determining said optimum gradation balance data based on weighted mean values of said first to third gradation balance data.

30. An image data conversion method as claimed in claim 26, wherein said steps A and B comprise the steps of:

obtaining representative values from image data of a great number of image frames recorded on the same type color photographic film as said original frame;

obtaining for each color a high-density reference value and a low density reference value of said original frame;

obtaining for each color a high-density reference representative value and a low-density reference representative value from said representative values, in correspondence with said high-density and low-density reference values of said original frame;

obtaining first gradation balance data which assigns said high- density and low-density reference representative values of each color to conversion values to reproduce at respectively predetermined color densities;

selecting pixels from said original frame based on a standard defined by said representative values;

averaging image data of said selected pixels;

obtaining second gradation balance data which assigns said average image data to a conversion value of each color to reproduce at a predetermined color density;

providing a gradation balance conversion table for each color based on said first gradation balance data by connecting two coordinate points which are defined by said high-density reference representative value and said conversion value assigned to said high-density reference representative value, on one hand, and said low-density reference representative value and said conversion value assigned to said low-density reference representative value, on the other hand;

shifting said gradation balance conversion table based on said second gradation balance data, so as to extend across a coordinate point which is defined by said average image data and said conversion value assigned to said average image data; and determining said optimum gradation balance data based on said shifted gradation balance conversion table.

31. An image data conversion method as claimed in claim 26, wherein said steps A and B comprise the steps of:

obtaining representative values from image data of a great number of image frames recorded on the same type color photographic film as said original frame;

obtaining for each color a high-density reference value and a low density reference value of said original frame;

obtaining first gradation balance data which assigns said high-density and low-density reference values of each color of said original frame to conversion values to reproduce at respectively predetermined color densities;

selecting pixels from said original frame based on a standard defined by said representative values;

averaging image data of said selected pixels; and obtaining second gradation balance data which assigns said averaged image data to a conversion value of each color to reproduce at a predetermined color density;

providing a gradation balance conversion table for each color based on said first gradation balance data by connecting two coordinate points which are defined by said high-density reference value and said conversion value assigned to said high-density reference value, on one hand, and said low-density reference value and said conversion value assigned to said low-density reference value, on the other hand;

shifting said gradation balance conversion table based on said second gradation balance data, so as to extend across a coordinate point which is defined by said average image data and said conversion value assigned to said average image data; and determining said optimum gradation balance data based on said shifted gradation balance conversion table.

32. An image data conversion method as claimed in claim 26, wherein said same type color photographic film includes a filmstrip or a series of filmstrips containing a great number of image frames, and all or part of said great number of image frames are used for gradation balance detection.

33. A digital printer for recording an image on a recording material based on image data detected from an original frame on a color photographic film, said printer comprising:

image data input means for inputting said image data;

gradation balance detection means for detecting by use of different methods a variety of gradation balance data from representative values of image data of a great number of image frames which are sorted and accumulated according to density levels of said color photographic film;

gradation balance deciding means for deciding on optimum gradation balance data by selecting or combining said variety of gradation balance data;

gradation curve data memory means storing gradation curve data;

conversion table producing means for producing a gradation conversion table from said optimum gradation balance data and said gradation curve data read from said gradation curve data memory;

image data conversion means for converting said image data of said original frame through said gradation conversion table; and image recording means for recording said reproduced image based on said converted image data.

34. A digital printer as claimed in claim 33, wherein said gradation curve data is to determine lightness of said reproduced image, whereas said gradation balance data is to determine gray balance of said reproduced image.

35. An image data conversion method for converting image data of an original frame recorded on a negative film of a particular photosensitive film type, into recording data for recording a reproduced image as a hard copy, said method comprising:

A. providing predetermined gradation curve data, including a respective gradation curve representation for each of a plurality of different photosensitive film types, each representing the characteristic curve of a corresponding one of said plurality of different photosensitive film types;

B. processing other frames of images to obtain accumulated density values, said other frames being recorded on more than one of said plurality of different photosensitive film types, said processing comprising, for each of said other frames:

B-1. providing a film type signal representing the one of said plurality of different photosensitive film types on which said other frame is recorded, B-2. scanning said other frame to provide pre-scanning image data of said other frame, B-3. selecting pixels from said pre-scanning image data of said other frame, based on a predetermined selection standard, wherein said predetermined selection standard selects pixels having densities in a range around mean density values for a given density level for said photosensitive film type indicated by said film type signal, B-4. accumulating density information relating to said pixels selected from said pre-scanning image data of said other frame, thereby providing accumulated density values, B-5. arranging said accumulated density values based on said film type signal, and further on the basis of a density level of a first one of three predetermined colors, and B-6. determining a value representing the number of said selected pixels accumulated in said memory in each said density level; and C. after said steps A and B, processing said original frame, including:

C-1. detecting said particular photosensitive film type of said negative film on which said original frame is recorded, and outputting a film type signal representative of said particular photosensitive film type, C-2. scanning said original frame to provide main scanning image data and pre-scanning image data of said original frame, C-3. selecting pixels from said pre-scanning image data of said original frame, based on said predetermined selection standard, C-4. updating said accumulated density values with density information relating to said pixels selected from said pre-scanning image data of said original frame, C-5. calculating gradation balance curves representing relationships in said accumulated density values between densities of said three predetermined colors, C-6. determining a first high density reference value and a first low density reference value, from said pre-scanning image data of said original frame, for said first predetermined color, C-7. calculating respective high and low density reference values for the other two colors of said three predetermined colors based on said first high and low density reference values and said gradation balance curves, C-8. determining, for each of said three predetermined colors, a respective highlight recording density and a respective shadow recording density, C-9. after steps C-1 through C-8, for each of said three predetermined colors, producing a gradation balance conversion table based on a line connecting a coordinate point defined by said respective high density reference value and said respective highlight recording density, and another coordinate point defined by said respective low density reference value and said respective shadow recording density, C-10. modifying said gradation balance conversion tables with said respective gradation curve representation for said particular photosensitive film type indicated by said film type signal, to provide gradation conversion tables, C-11. calculating an image recording basic amount for said original frame, based on said pre-scanning image data for said original frame, C-12. producing an image data conversion table by modifying said gradation conversion tables with said image recording basic amount to take into account recording conditions, and C-13. converting said main scanning image data into said recording data using said image data conversion table.

* * * * *